(12) United States Patent
Coombes et al.

(10) Patent No.: US 10,047,921 B2
(45) Date of Patent: Aug. 14, 2018

(54) SYSTEM AND METHOD FOR PERFORMING SELF-TEST AND PREDICTING EMERGENCY LIGHTING FIXTURES LIFE EXPECTANCY

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/868,731

(22) Filed: Jan. 11, 2018

(65) Prior Publication Data

US 2018/0128437 A1 May 10, 2018

Related U.S. Application Data

(63) Continuation-in-part of application No. 15/809,739, filed on Nov. 10, 2017, which is a continuation-in-part of application No. 15/809,797, filed on Nov. 10, 2017, application No. 15/868,731, which is a continuation-in-part of application No.
(Continued)

(51) Int. Cl.
*F21S 9/02* (2006.01)
*H04W 4/38* (2018.01)
*H05B 39/04* (2006.01)
*F21V 23/04* (2006.01)

(52) U.S. Cl.
CPC .......... *F21S 9/022* (2013.01); *F21V 23/0457* (2013.01); *H04W 4/38* (2018.02); *H05B 39/041* (2013.01)

(58) Field of Classification Search
CPC ....... F21S 9/022; H04W 4/38; F21V 23/0457; H05B 39/041
See application file for complete search history.

(56) References Cited

U.S. PATENT DOCUMENTS

| | | |
|---|---|---|
| 3,971,065 A | 7/1976 | Bayer |
| 4,245,241 A | 1/1981 | Sato et al. |

(Continued)

FOREIGN PATENT DOCUMENTS

| | | |
|---|---|---|
| CA | 1315331 C | 3/1993 |
| CA | 2594246 A1 | 1/2008 |

(Continued)

OTHER PUBLICATIONS

Lighting Research Center, ASSIST: Alliance for Solid-State Illumination Systems and Technologies, Feb. 15, 2005, 2 pages, http://www.lrc.rpi.edu/programs/solidstate/assist/index.asp.

(Continued)

*Primary Examiner* — Jimmy Vu
*Assistant Examiner* — Pedro C Fernandez
(74) *Attorney, Agent, or Firm* — Moyles IP, LLC

(57) ABSTRACT

A system for managing emergency lighting is generally described. In particular, the present disclosure relates to self-tests and predictive life expectancy operations of emergency lighting systems. Further, the present disclosure relates to an automated system and method for performing self-tests and predicting emergency lighting fixture life expectancy. In the exemplary embodiments, emergency lighting system tests may be automatically scheduled, carried out, and evaluated.

8 Claims, 26 Drawing Sheets

Related U.S. Application Data

15/809,559, filed on Nov. 10, 2017, application No. 15/868,731, which is a continuation-in-part of application No. 15/785,808, filed on Oct. 17, 2017, and a continuation-in-part of application No. 15/424,868, filed on Feb. 5, 2017, and a continuation-in-part of application No. 15/360,879, filed on Nov. 23, 2016, now Pat. No. 9,655,197.

(60) Provisional application No. 62/521,817, filed on Jun. 19, 2017, provisional application No. 62/579,459, filed on Oct. 31, 2017, provisional application No. 62/420,908, filed on Nov. 11, 2016, provisional application No. 62/510,739, filed on May 24, 2017, provisional application No. 62/445,669, filed on Jan. 12, 2017, provisional application No. 62/306,636, filed on Mar. 11, 2016, provisional application No. 62/608,129, filed on Dec. 20, 2017.

(56) References Cited

U.S. PATENT DOCUMENTS

| | | | |
|---|---|---|---|
| 4,894,601 | A | 1/1990 | Watkins |
| 4,945,280 | A | 7/1990 | Beghelli |
| 5,154,504 | A | 10/1992 | Helal et al. |
| 5,770,928 | A | 6/1998 | Chansky et al. |
| 6,538,568 | B2 | 3/2003 | Conley, III |
| 7,045,964 | B1 | 5/2006 | Hermans |
| 7,248,297 | B2 | 7/2007 | Catrysse et al. |
| 7,777,427 | B2 * | 8/2010 | Stalker .................. G05F 1/00 315/291 |
| 7,893,632 | B2 | 2/2011 | Meijer et al. |
| 7,950,832 | B2 | 5/2011 | Tanaka et al. |
| 8,319,452 | B1 | 11/2012 | Hamel et al. |
| 8,442,785 | B2 | 5/2013 | Walters et al. |
| 8,643,304 | B2 | 2/2014 | Hamel et al. |
| 8,729,834 | B1 | 5/2014 | Funderburk et al. |
| 8,928,232 | B2 * | 1/2015 | Aggarwal .......... H05B 37/0245 315/149 |
| 9,084,308 | B2 * | 7/2015 | Morrow ................ H05B 37/02 |
| 9,131,581 | B1 | 9/2015 | Hsia et al. |
| 9,148,936 | B2 | 9/2015 | Wagner et al. |
| 9,277,632 | B2 | 3/2016 | Hegarty |
| 9,408,280 | B2 | 8/2016 | Schröder et al. |
| 9,521,733 | B2 | 12/2016 | Brand et al. |
| 9,655,197 | B1 | 5/2017 | Coombes et al. |
| 2012/0025740 | A1 | 2/2012 | Schenk et al. |
| 2012/0139417 | A1 | 6/2012 | Mironichev et al. |
| 2013/0181636 | A1 | 7/2013 | Agrawal |
| 2013/0193876 | A1 * | 8/2013 | Cleland .............. H05B 37/0245 315/297 |
| 2014/0074434 | A1 | 3/2014 | De Lima et al. |
| 2014/0097758 | A1 | 4/2014 | Recker et al. |
| 2014/0320022 | A1 | 10/2014 | Lee |
| 2014/0375221 | A1 | 12/2014 | Mans et al. |
| 2015/0130365 | A1 | 5/2015 | Kim et al. |
| 2016/0014867 | A1 | 1/2016 | Luk |
| 2016/0036268 | A1 | 2/2016 | Laherty et al. |
| 2016/0088711 | A1 | 3/2016 | Ng et al. |
| 2016/0302273 | A1 | 10/2016 | Wee et al. |
| 2016/0360594 | A1 | 12/2016 | Chemel |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2380620 A | 4/2003 |
| GB | 2494151 A | 3/2013 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.
Kevin Dowling, PhD, Lumen Maintenance IESNA LM-80-2008, Oct. 30, 2008, 16 pages, www1.eere.energy.gov/buildings/publications/pdfs/ssl/lm80-webcast_10-30-08.pdf.
Jeff McCullough, LC, Pacific NW National Lab, Energy Star® Webinar:Requirements for Lumen Maintenance, Oct. 30, 2008, 18 pages, www1.eere.energy.gov/buildings/publications/pdf.
M-CAM Patently Obvious, Kodak's Final Gasp? Intellectual Property Analysis of Kodak v Apple, HTC, Jan. 13, 2012, 8 pages, http://www.globalinnovationcommons.org.
Claire Swedberg, IoT Lights Up Streets With Smart City Initiative, RFiD Journal, Jul. 23, 2015, 3 pages, http://www.iotjournal.com/articles/view?13303.
DALI, Discover DALI—Excellent System Performance, Mar. 31, 2014, 5 pages, http://dali-ag.org/discover-dali.html.
International Search Report and Written Opinion of International Application No. PCT/IB2017/051390, dated May 31, 2017, 13 pgs.
International Search Report and Written Opinion of International Application No. PCT/IB2017/051386, dated Jun. 6, 2017, 12 pgs.

* cited by examiner

SYSTEM AND METHOD FOR PERFORMING SELF-TEST AND PREDICTING EMERGENCY LIGHTING FIXTURES LIFE EXPECTANCY

CROSS REFERENCE TO RELATED APPLICATIONS

This application is a continuation-in-part of and claims priority to U.S. patent application Ser. No. 15/809,739 filed Nov. 10, 2017, which claims the benefit of U.S. Provisional Patent Application No. 62/521,817 filed Jun. 19, 2017. This application is a continuation-in-part of and claims priority to U.S. application Ser. No. 15/809,797 filed on Nov. 10, 2017, which claims the benefit of U.S. Provisional Patent Application No. 62/579,459 filed on Oct. 31, 2017. This application is a continuation-in-part of and claims priority to U.S. patent application Ser. No. 15/809,559 filed Nov. 10, 2017, which claims the benefit of U.S. Provisional Patent Application No. 62/420,908 filed Nov. 11, 2016. This application is a continuation-in-part of and claims priority to U.S. patent application Ser. No. 15/785,808 filed Oct. 17, 2017, which claims the benefit of U.S. Provisional Patent Application No. 62/510,739 filed May 24, 2017 and U.S. Provisional Patent Application No. 62/420,908 filed Nov. 11, 2016, and is a continuation-in-part of and claims priority to U.S. patent application Ser. No. 15/424,868 filed Feb. 5, 2017, which claims the benefit of U.S. Provisional Patent Application No. 62/445,669 filed Jan. 12, 2017 and is a continuation-in-part of and claims priority to U.S. patent application Ser. No. 15/360,879 filed Nov. 23, 2016, now U.S. Pat. No. 9,655,197, which claims the benefit of U.S. Provisional Patent Application No. 62/306,636 filed Mar. 11, 2016. This application claims the benefit of U.S. Provisional Patent Application No. 62/608,129 filed Dec. 20, 2017. This application claims the benefit of U.S. Provisional Patent Application No. 62/445,669 filed Jan. 12, 2017. The disclosures of all of the applications listed above are incorporated herein by reference in their entireties.

FIELD

The disclosure generally relates to devices, systems, and methods for managing emergency lighting. More specifically, the disclosure relates to self-testing and predictive emergency lighting devices, systems, and methods—for example, emergency lighting devices, systems, and methods for performing a required emergency lighting self-test and predicting emergency lighting fixture life expectancy.

BACKGROUND

In commercial buildings and various other venues, there is a need to provide emergency lighting in the event of a mains (i.e., main power supply) power outage. Mains electricity is the electrical power supplied via mains power systems (such as power grids) found throughout the world to, among other things, homes and businesses. An interruption of mains power, commonly referred to as a mains power outage, includes brownouts (e.g., a reduction in or restriction on the availability of electrical power in a particular area) and blackouts (e.g., a total loss of power to an area). Regulations in many areas of the world require that emergency lighting systems in, for example, commercial buildings maintain a minimum level (lux) of light for a minimum amount of time to allow people to safely exit the building in the event of mains power outage. The regulations may also require that the emergency lighting system(s) are tested periodically to ensure compliance with the emergency lighting requirements. Conducting periodic tests to ensure that emergency lighting systems continue to meet regulatory requirements is especially important as lighting systems increasingly incorporate light emitting diodes (LED) as light sources, because LEDs tend to not fail suddenly and completely as with some other light sources. Rather, the luminosity of an LED tends to slowly degrade over time, which may lead to a more subtle dip below the required amount of light emitted by the LED.

Exemplary known emergency lighting systems include maintained and non-maintained battery backup fixtures. A maintained fixture is a fixture that is, or may be, illuminated all the time. The maintained fixture switches to an emergency fixture if the unswitched mains feed has no power and also includes a switched feed to control the light (i.e., turn it off) without switching the light to emergency mode. A non-maintained fixture is a fixture that is only illuminated during a mains power outage when there is no power from an unswitched feed. A fixture of either type requires a constant live electrical feed to keep the battery backup power source charged. The battery backup may be a centralized battery system which replaces the mains feed to the lighting fixture circuit(s) in the event of a mains power loss.

Many typical, known test procedures for emergency lighting systems are manual and require, e.g., a maintenance engineer to physically cut the mains power to the lighting system to allow the battery (or other) backup power supply to power the emergency fixtures. The maintenance engineer must then ensure that the fixtures maintain the required amount of light for the required amount of time. Such a manual method is laborious, time consuming, and costly. Digital Addressable Lighting Interface (DALI®) protocol is a known, standard lighting protocol including emergency testing protocol(s) that may reduce the time and cost of the testing procedure. For example, the test procedure may be initiated according to a schedule or manually at a control panel. However, a maintenance engineer must nonetheless be present to observe the testing procedure and results. Further, in countries such as the United Kingdom (UK), the emergency lighting has to perform with minimum lux levels for a certain amount of time, e.g., three hours, at which time the test is completed and the results of the test are simply pass/fail based on visual confirmation from the maintenance engineer that the required amount of light was maintained for the required amount of time. Typical emergency lighting tests may include, for instance, a monthly visit to cut the power to the mains unswitched power supply to each circuit, check all the emergency lights and sign a register that the test was carried out and all emergency lights were ok. Then the same test would be carried out annually but the engineer would have to wait during the test period (e.g., three hours in the UK) and file a report stating all emergency lights were still lit at the end of the time period.

There are many standalone self-test emergency systems which utilize the DALI® protocol that have built in emergency test functionality, with a centralized emergency monitoring system to replace the physical switching to be automated/centrally instigated. Known lighting systems may include a "smart emergency system," e.g., a system having a DALI® set up and capable of two-way communications with a user or control system. For example, DALI® commands may initiate an emergency test by switching a light source to battery backup power and then report back information such as test complete for 3 hours, etc., over DALI®. The DALI® protocol can also report back to the central system information about the batteries and drivers, i.e. number of switching cycles, how many times the batteries have been discharged, if the power to the fixture lasted the correct amount of time (as a yes/no output). Such systems are typically expensive to install, lack dynamic integration with the lighting systems and devices in the building, do not provide remote control, and do not offer any predictive emergency analytics. Those systems are configured based on the present conditions and components during initialization and cannot adapt to changes regarding lighting devices, environments, and/or requirements. In addition, such systems can only offer estimations of failure based on the number of switching cycles, discharge cycles and warranty/expected lifetime usage information, e.g., from a manufacturer. Further, many of these systems nonetheless require a person to be present to verify that the emergency lights function as required.

With respect now to FIG. 1, a known maintained luminaire fixture 10 is shown including, among other things, a fixture that is normally in use (illuminated) and can be switched via the switched supply (and dimmed if it includes a dimmable driver). As shown in FIG. 1, an emergency module 15 and battery supply 20 are switchably connected to an LED light fitting 30 with an unswitched live supply 50 of power for normal operation. The fixture 10 must have a charge indicator LED 40 that is located below a ceiling or other structure in which the fixture 10 is installed and visible to users. The charge indicator LED 40 indicates whether the battery is connected and charged. Other components of the fixture 10 may be above or within the ceiling or structure in which the system is installed, or elsewhere.

The fixture 10 shown in FIG. 1 may be connected to an overall lighting system in typically two ways. First, if the fixture 10 is non-dimmable or dimmable according to a 1-10V protocol (i.e., needs a relay to cut power to turn it off) it has 2 gateways. One gateway is connected to a switched supply 60 of power to handle the on/off switching and/or dimming. The second gateway is connected to the unswitched live supply 50 to handle cutting the power to simulate power loss for testing.

With reference now to FIG. 2, a known non-maintained luminaire fixture 10' that is normally off is shown including, among other things, a single mains feed 50' (not switched) such as a 240V power supply to an emergency module 15' including a connection 20' to a battery supply. The fixture under battery power kicks in if the mains feed 50' is lost. The fixture 10' must also have a charge indicator LED (not shown) that is located below a ceiling or other structure in which the fixture 10' is installed and visible to users. The charge indicator LED indicates whether the battery is connected and charged. Other components of the fixture 10' may be above or within the ceiling or structure in which the system is installed, or elsewhere. The non-maintained fixture 10' shown in FIG. 2 does not include a dimming function as the fixture 10' is only illuminated in an emergency, therefore a simplified gateway without a dimming control, such as shown in FIG. 3, would be sufficient to control the fixture 10' shown in FIG. 2.

Accordingly, there is a need for emergency lighting systems having automated self-test capability including predictive analytics on the emergency lights. There is also a need for such systems to dynamically integrate with overall lighting systems including, e.g., maintained, non-maintained, and smart emergency systems having different, replaceable, and/or reconfigurable components and operations.

BRIEF DESCRIPTION

This disclosure relates to, among other things, devices, systems, and methods for performing automated self-tests and determining life expectancy of emergency lighting systems. In an aspect, the exemplary disclosed embodiments may include a relay for turning a luminaire/emergency lighting device on and off and/or a dimming control driver to control dimming and other emergency test/switching functions. Thus, the relay commands and dimming commands are separate commands in the exemplary embodiments. This configuration allows a single gateway to control operation of the luminaire/emergency lighting device in a variety of wiring installations with a variety of dimming control drivers, for example and without limitation, 3 Core or 4 Core installations with DALI® drivers or analogue drivers in maintained, non-maintained, and/or smart emergency lighting systems. This exemplary configuration also obviates the need for a switched live power supply and requires only a single permanent live power supply to the single gateway. Accordingly, the gateway is powered constantly regardless of the wiring installation and a power meter and/or sensor subsystem may also be powered constantly to provide continuous data to servers as part of emergency self-tests and predictive determinations for the emergency lighting system.

The exemplary disclosed embodiments include, among other things, a system for performing an emergency lighting fixture test and predicting life expectancy of an emergency lighting fixture, including: a gateway configured to control illumination of a luminaire including an emergency power source, via a dimming control driver; a sensor subsystem configured to measure at least a color intensity of light that is emitted by the luminaire and transmit data regarding the color intensity to a server either directly or via the gateway, wherein the server is in data communication with at least one of the sensor subsystem and the gateway; and, a permanent live power supply connected to the gateway and to the luminaire via the gateway, wherein the gateway is further configured to control the power supply to switch the luminaire on and off via a first connection and control the dimming control driver via a second connection, and wherein switching off the power supply to the luminaire initiates illumination of the luminaire by the emergency power source to conduct a test of the emergency power source.

In an aspect, the exemplary disclosed systems may be configured to be installed as part of at least one of a maintained lighting fixture, a non-maintained lighting fixture, and a smart lighting fixture, and may include either a digital dimming control driver such as a Digital Addressable Lighting Interface (DALI®) driver or an analogue driver such as a 0-10V driver. The exemplary systems may be configured to be installed in a variety of lighting installations including, for example, 3 core and 4 core lighting systems.

In a further aspect, the exemplary disclosed systems include a sensor subsystem with at least one color sensor and at least one environment sensor. The color sensor is configured to face the luminaire directly and measure the light/color intensity of the light that is emitted by the luminaire. The color sensor(s) may include, for example, a Red, Green, Blue (RGB) sensor and/or a Yellow, Red, Green, Blue (YRGB) sensor. The environment sensor is configured to face away or in a downward direction from the luminaire and measure at least one parameter of an environment in which the luminaire is installed, for example, ambient light, temperature, sound, humidity, barometric pressure, motion, footfall (the number of people passing through or present in the environment), etc.

In other aspects, the exemplary disclosed systems and methods include a server for determining whether the emergency power source is capable of powering the luminaire at a requisite lux level and/or at a requisite lux level for a requisite amount of time of emergency operation, based at least in part on the data regarding the light/color intensity of the light that is emitted by the luminaire during the emergency lighting fixture self-test. The server may be further configured to determine at least one of a dimming level and a dimming control protocol of the luminaire at which the emergency power source is capable of powering the luminaire at the requisite lux level for the requisite amount of time. Where the self-test is a discharge test, the emergency power source is completely discharged and the server is further configured to compare the data regarding the light/color intensity of the light that is emitted by the luminaire at different times during the discharge test, and calculate a predictive curve for life expectancy of the emergency power source, based at least in part on the comparison. The server may be further configured to calculate at least one of a half-life and an end of life of the emergency power source, based at least in part on a comparison of the data regarding the light/color intensity of the light that is emitted by the luminaire during two or more discharge tests.

In certain exemplary embodiments, the emergency power source is a rechargeable battery, the system further includes a charging device configured to charge the rechargeable battery, and the charging device is connected to the power supply via the first connection. A power meter may be configured to measure an amount of power being drawn by the gateway during a battery charging cycle. The server may be further configured to compare the amount of power being drawn by the gateway during the battery charging cycle with an amount of power drawn by the gateway in a non-charging state and, if the power being drawn by the gateway during the battery charging cycle is less than the amount of power drawn by the gateway in a non-charging state for an amount of time, determine that the charging is complete and calculate a battery charging cycle duration. A required duration for the discharge test may be calculated based at least in part on the battery charging cycle duration, e.g., an amount of time that is required to charge the rechargeable battery to a level at which the rechargeable battery is capable of powering the luminaire at a requisite lux level for a requisite amount of time of emergency operation.

In further aspects of the exemplary disclosed systems and methods, the server may be configured to calculate a life expectancy of the emergency power source, based at least in part on the battery charging cycle duration, e.g., based on a comparison of the battery charging cycle duration to known performance values for the rechargeable battery or the battery charging cycle duration in two or more discharge tests on the rechargeable battery.

The exemplary disclosed methods include, for example, a method for performing an emergency lighting fixture function test, including: logging a start time for the test; switching off via a gateway a power supply to a luminaire; initiating illumination of the luminaire via an emergency power source; measuring with a color sensor configured to face the luminaire directly a light/color intensity of the light that is emitted by the luminaire either continuously or at intervals; measuring with an environment sensor an ambient light value in an environment in which the luminaire is installed, either continuously or at intervals; transmitting data regarding the light/color intensity of the light that is emitted by the luminaire and the ambient light value respectively from the color sensor and environment sensor to a server, either directly or via the gateway; determining with the server at least one of a lux level at the luminaire and a floor lux in the environment, based at least in part on the data regarding light/color intensity of the light that is emitted by the luminaire and the ambient light value; determining with the server whether the lux level at the luminaire and/or the floor lux is above a threshold lux level; logging whether the test is a PASS or FAIL, based at least in part on whether the lux level at the luminaire and/or the floor lux is above a threshold lux level.

The exemplary disclosed methods also include, for example, a method for performing an emergency lighting fixture duration test, including: a) logging a start time for the test; b) switching off via a gateway a power supply to a luminaire; c) initiating illumination of the luminaire via an emergency power source; d) measuring with a color sensor configured to face the luminaire directly a light/color intensity of the light that is emitted by the luminaire, either continuously or at intervals; e) measuring with an environment sensor an ambient light value in an environment in which the luminaire is installed, either continuously or at intervals; f) transmitting data regarding the light/color intensity of the light that is emitted by the luminaire and the ambient light value respectively from the color sensor and environment sensor to a server, either directly or via the gateway; g) determining with the server at least one of a lux level at the luminaire and a floor lux in the environment, based at least in part on the data regarding light/color intensity of the light that is emitted by the luminaire and the ambient light value; h) determining with the server whether the lux level at the luminaire and/or the floor lux is above a threshold lux level; i) logging whether the test is a PASS or FAIL, based at least in part on whether the lux level at the luminaire and/or the floor lux is above a threshold lux level, and, if the test is a PASS, repeating steps d)-h) for at least one of an amount of time or a degree of depletion of the emergency power source, or, if the test is a FAIL, logging an end time for the test and restoring power to the luminaire. In certain exemplary embodiments where the emergency power source is a rechargeable battery, the method further includes logging a battery charging cycle start time after restoring power to the luminaire; charging the rechargeable battery with a charging device that is connected to the power supply via the gateway; measuring with a power meter an amount of power being drawn by the gateway during the charging; comparing with the server the amount of power being drawn by the gateway during charging with an amount of power drawn by the gateway in a non-charging state and, if the power being drawn by the gateway during the charging is less than the amount of power drawn by the gateway in a non-charging state for an amount of time, determining that the charging is complete; and, logging a battery charging cycle end time and a battery charging cycle duration.

BRIEF DESCRIPTION OF THE DRAWINGS

The above and still further features and advantages of exemplary disclosed embodiments will become apparent upon consideration of the following detailed description of embodiments thereof, especially when taken in conjunction with the accompanying drawings, and wherein.

Figure 1:
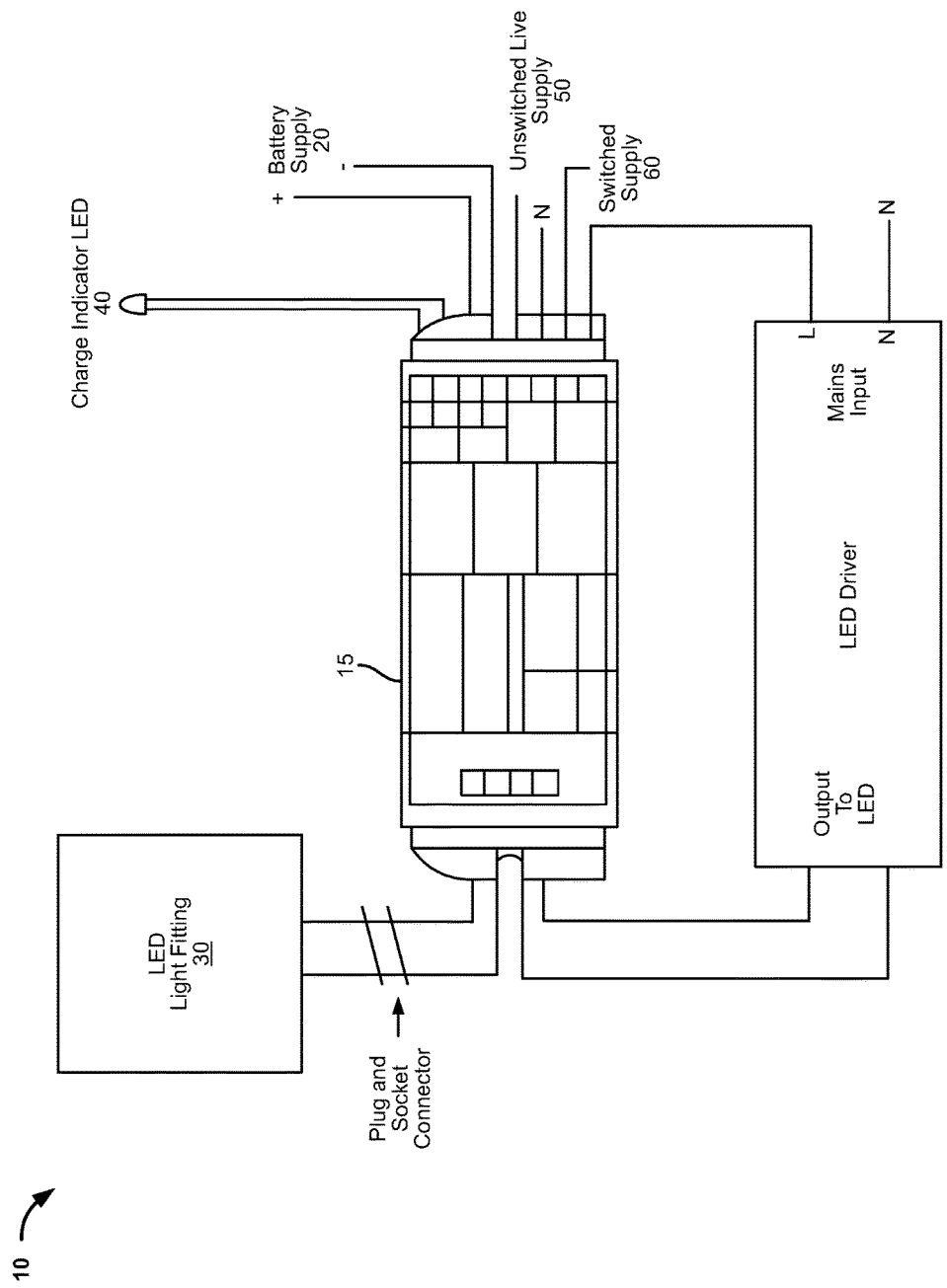
FIG. 1 is a Standard Maintained Setup fixture according to prior art.
Figure 2:
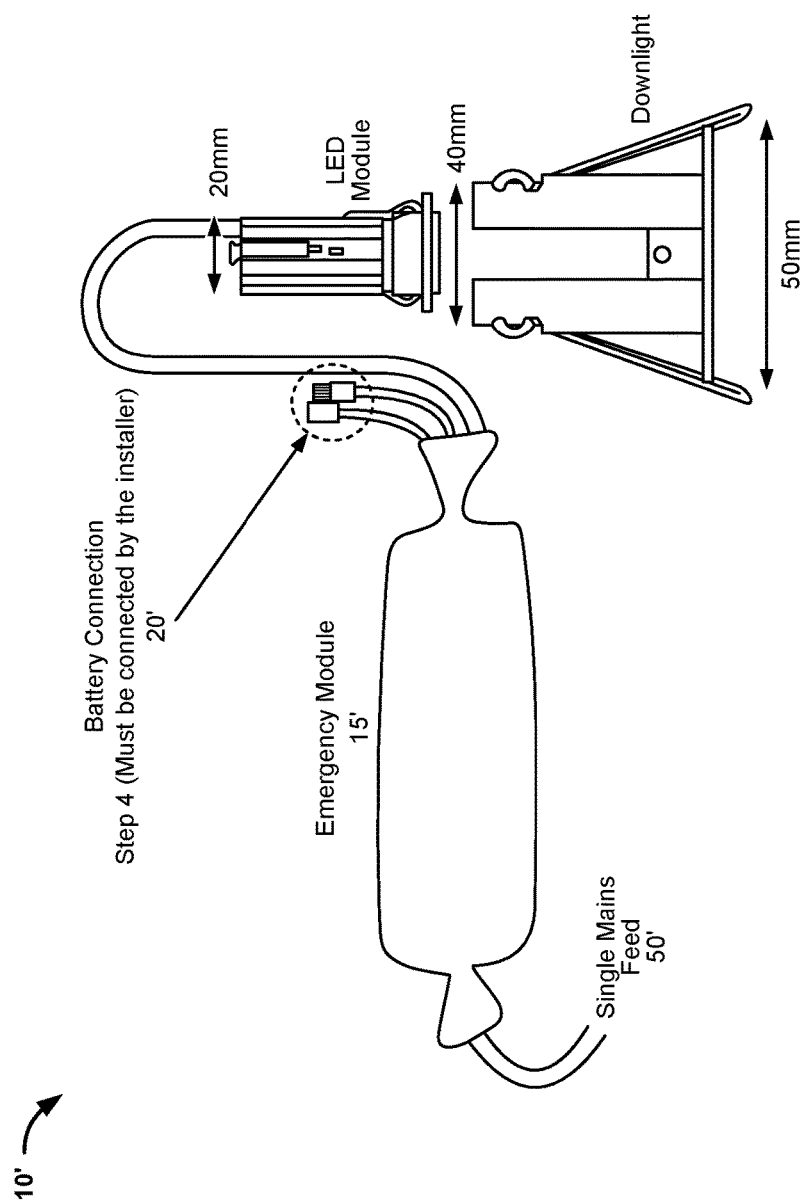
FIG. 2 is a Non-Maintained Setup fixture according to prior art.

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

Exemplary disclosed embodiments relate generally to devices, systems, and methods for emergency lighting systems and identifying lumen depreciation over time. The exemplary devices, systems, and methods may predict life expectancy of a plurality of lighting devices. Additionally, the exemplary disclosed embodiments predict lumen degradation, which facilitates maintenance of lighting devices by the manufacturer/user/customer. Embodiments of the present disclosure will be illustrated below in conjunction with the figures. For purposes of this disclosure, the phrases "devices," "systems," and "methods" may be used either individually or in any combination referring without limitation to disclosed components, grouping, arrangements, steps, functions, or processes.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participate in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, database functions in various embodiments may be stored within compartments of a single database or within individual databases. In any event, the disclosure is considered to include a tangible storage medium or distribution medium and prior art-recognized equivalents and successor media, in which the software implementations of the present disclosure are stored.

Figure 3:
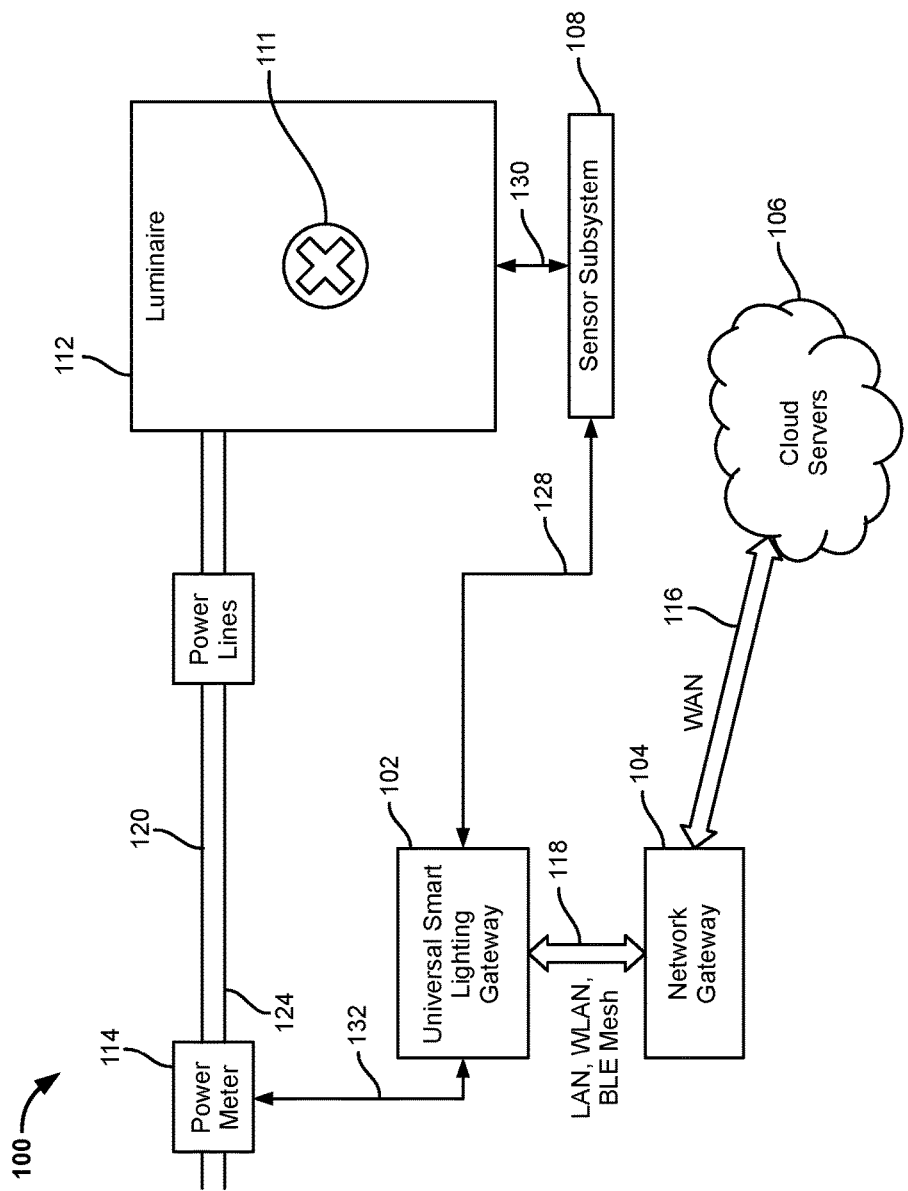
FIG. 3 is a high-level system diagram of the gateway without dimming control protocol, according to an aspect.

According to an aspect and with reference to FIG. 3, an automated system 100 for performing self-tests and predicting emergency lighting fixtures life expectancy is described. In an exemplary embodiment, the system 100 may include at least one luminaire 112 and/or LED 111 configured to communicate with at least one gateway 102 such as a Universal Smart Lighting Gateway (USLG), at least one sensor subsystem 108 configured to sense color/light intensity of the light that is emitted by the luminaire 112 and monitor at least one aspect of the environment in real time, at least one power meter 114 configured to measure power consumption by the luminaire 112 in real time, and at least one server such as cloud servers 106. In the same or other embodiments, the server may be a local server, hosted server, or any other server consistent with this disclosure. For purposes of this disclosure, "environment" means generally and without limitation a space or area in which a luminaire or lighting system is installed. Further, for purposes of this disclosure, "real time" generally means substantial concurrency without any particular timeframe or limitation.

In an aspect, and in accordance with the disclosure herein, each luminaire 112/LED 111 may be configured to act as an emergency lighting fixture during a mains power outage to the luminaire 112/LED 111. As described in detail herein, the system 100 is further configured to predict when an emergency light fixture will not meet a minimum lumen level/lux. The system 100 is also configured to test an emergency light fixture in an environment that otherwise contains ambient light. The system is additionally configured to identify which emergency light fixtures are showcasing accelerated failure modes and review what parameters could be causing said failure modes. The system is configured to perform self-tests and predict emergency lighting fixture life expectancy for non-maintained, maintained and smart emergency fixtures.

In the exemplary embodiment, each luminaire 112 and/or LED 111 includes at least one luminaire driver and/or LED driver (not shown). For purposes of this disclosure, a "driver" is generally and without limitation a device or system that controls and/or actuates a device, system, or method, such as illuminating and/or dimming a luminaire, consistent with this disclosure. In various exemplary embodiments, the luminaire 112 is a system that may include a single luminaire or multiple luminaires connected with a single common interface to power lines 120, 124. The sensor subsystem 108 and power meter 114 are each connected with each of the gateway 102 and the luminaire 112. The at least one sensor subsystem 108 includes at least two sensors. One sensor is an environment sensor dedicated to environment sensing, and may be arranged such that it faces away from and/or extends in a downwardly fashion, from the luminaire 112. A second sensor is an upward facing sensor that faces the luminaire 112 directly. In the exemplary disclosed embodiments, the upward facing sensor is a color sensor such as a Red, Green, Blue (RGB) sensor or Yellow, Red, Green, Blue (YRGB) sensor.

According to an aspect, one or more cloud servers 106 are configured to calculate and predict depreciation of the light output of each luminaire 112 and/or LED 111, which will degrade over time. In exemplary disclosed embodiments of a luminaire 112 with dimming control (110, FIG. 4), the cloud server(s) 106 are configured to calculate and predict depreciation of the light output of each luminaire 112/LED 111 at some or all of the dimming levels. The exemplary disclosed calculations, predictions, determinations, processes, etc., performed by a server according to aspects of this disclosure may be performed by a single server or multiple servers and the disclosure is not limited to any number of servers with respect to the system in general or any particular aspect.

The sensor subsystem 108 may be configured to report a change in measured information relative to a variable, such as an operating parameter, on a display device associated with the luminaire 112 and configured to display, e.g., to a user, information regarding the operating parameter(s) of the luminaire 112. In addition, the sensor subsystem 108 detects and/or measures environmental data in real time. In the exemplary embodiment shown in FIG. 3, the gateway 102 is connected to cloud servers 106 via a backhaul interface 118 discussed further below. In the same or other embodiments, the gateway 102 may be connected to one or more servers 106 via at least one of a wired connection and a wireless connection. The sensor subsystem 108 may communicate with servers 106 either directly, via a wired or wireless connection, or via gateway 102.

According to an aspect, a power meter 114 may be connected electrically between the gateway 102 and the luminaire 112 and may be connected electrically to the luminaire 112 via the power lines 120, 124. The power meter 114 may be connected to the gateway 102 via the power meter interface 132. The power meter 114 may be connected to an input line of the luminaire 112 in such a way that the power meter 114 measures electrical power drawn by the luminaire 112 at any given moment in real time. According to an aspect, the power meter 114 is connected to the gateway 102 to provide the real time power measurements to the gateway 102 and/or servers 106. The interface 132 between the gateway 102 and the power meter 114 may be a Universal Asynchronous Receiver/Transmitter (UART) or any other communication interface consistent with this disclosure. The interface 120, 124 between the power meter 114 and the luminaire 112 may depend on the type of power meter 114 being used, as is known. Any known power meter(s) and associated connection(s) consistent with the spirit and scope of this disclosure may be used in the exemplary embodiments.

The system 100 may include a backhaul interface 118 for connecting the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an exemplary embodiment, the backhaul interface 118 is a Mesh BLE. The communication protocol may include the Mesh BLE. The gateway 102 is thus connected to the back-end network 104 via LAN, WLAN, WAN, Mesh BLE radio network or other techniques. This connection may allow another device (such as a server or processor) on the network local to the gateway 102 or via WAN in the cloud, to handle the predictive calculations and other calculations in accordance with the disclosure. Thus, the predictive calculations and others can be distributed between several devices or on a single device, local or remote to the gateway 102.

In the exemplary embodiment shown in FIG. 3 and according to an aspect, the sensor subsystem 108 detects and/or measures information regarding the luminaire 112 and the environment in which the luminaire 112 is installed. Exemplary information regarding the luminaire 112 may include, for example and without limitation, the color intensity and/or light intensity of the light that the luminaire is emitting. Exemplary information regarding the environment may include, for example and without limitation, the temperature, sound, barometric pressure, humidity, ambient light, movement, footfall (the number of people passing through or present in the environment), etc. In the exemplary embodiment, information from the sensor subsystem 108 is relayed to the gateway 102 which relays the information to the cloud servers 106 for storage, processing, and other operations in accordance with the disclosure. The sensor subsystem 108 may be arranged such that it connects via connection 130 to the luminaire 112 on one side and to the gateway 102 via a sensor interface 128 on the other side.

According to an aspect, the connection 130 between the luminaire 112 and the sensor interface 128 may be either physical or wireless and is not limited to a specific location. The location of the sensor subsystem 108 may be different for various types of sensors. In the same or other embodiments, sensor subsystem 108 transmits information to the cloud servers 106 directly, via a wired or wireless connection. Other information collected by the gateway 102 in the exemplary embodiment shown in FIG. 3 includes a current power level of the luminaire 112 as measured by the power meter 114.

The gateway 102 is configured to communicate with and/or control the sensor subsystem 108 and sensor protocols, such as reading schedules, via its sensor interface 128. For purposes of this disclosure, "protocol" means generally and without limitation one or more actions or series or sets of actions, functions, instructions, or operations. The type of hardware/wire(-less)/bus interfaces between the gateway 102 and the sensor subsystem 108, e.g., the number of wires, the type of wires or bus connectors, and/or wireless protocol, is not limited by the disclosure. The connections can be as simple as analog interface connectors and/or electrical/digital bus connectors of any kind.

The upward facing (color) sensor or combination of sensors of the sensor subsystem 108 faces the luminaire 112 directly and may measure multiple color channels of the light that the luminaire 112 is emitting. The color sensor may be configured to measure the color and/or light intensity. The color sensor can be based on a single color or a plurality of colors (e.g., Red, Green, Blue, and/or Yellow in certain embodiments). The downward facing (environment) sensor or combination of sensors of the sensor subsystem 108 faces away or in a downward direction from the luminaire 112 and may be a low resolution imaging sensor which could be an array of sensors combined into a low resolution imaging device, or a single application-specific integrated circuit (ASIC) that is, for example, an imaging sensor. According to other aspects, the environment sensor may include any number of sensors (collectively referred to as the "environment sensor") for detecting and/or measuring information regarding the environment in which the luminaire 112 is installed and may include, for example, a low resolution image sensor, an ambient light sensor, a temperature sensor, a humidity sensor, a motion sensor, etc. In an exemplary embodiment, the environment sensor includes at least a low resolution image sensor, an ambient light sensor, and a temperature sensor. In other embodiments, the environment sensor may include any number or type of sensors in accordance with this disclosure.

According to an aspect, the exemplary disclosed embodiments allow emergency operation testing of particular luminaires in environments that contain other sources of ambient light, such as non-emergency light fixtures, natural light, etc. The up looking (color) sensors are configured to directly face the luminaires for which they are measuring light intensity. Thus, the up looking sensors provide a light intensity of the particular luminaires that is substantially free of contributions from ambient light sources. An environment sensor that includes an ambient light sensor may provide further information about levels of ambient light, to additionally compensate for any ambient light contributions at the luminaire. Accordingly, emergency lighting operation testing using the disclosed exemplary embodiments may be performed without actively eliminating ambient light sources or their contributions to light intensity measurements. This provides flexibility regarding, e.g., times that emergency operation testing may be performed, because natural light ingress and/or safety considerations for people that may be in the testing environment may be disregarded if necessary or desired.

According to an aspect, the combination of the environment sensor and the color sensor may be provided as a single ASIC or as separate devices, all of which are also connected to the gateway 102 and/or the cloud servers 106 and may provide information periodically, in real time, or according to any desired schedule.

According to an aspect, the environment and color sensors of the sensor subsystem 108 are placed/connected on a fitting of the luminaire 112 and/or LED 111. The exact location of the sensors is not fixed as even two different luminaires by the same manufacturer of the same type may be assembled such that the sensor locations are different relative to the surface and dimensions of the fitting within certain tolerances. Thus, the location of the color and environment sensors on the fitting consistent with this disclosure is not limited.

In the exemplary disclosed embodiments, the color sensor may provide continuous measurements, or measurements at certain intervals, of color/light intensity of the light emitted by the luminaire 112/LED 111, for one or more colors. In certain exemplary embodiments, the colors may be Yellow, Red, Green, and Blue or Red, Green and Blue. These measurements may be specific to the particular color sensor and its design such that different color sensors may provide different values for the same measurement. However, as explained further below, the color/light intensity emitted by the luminaire 112/LED 111 will depreciate at the same relative rate regardless of the particular sensor. For example, the process of calibration of the color sensor is such that the depreciation of a sensor follows a known graph for the specific color sensor complementary metal-oxide-semiconductor (CMOS). In an exemplary disclosed embodiment, the color sensor readings are normalized by its previous readings, such that only the normalized change in reading is significant. Color sensors do not differ from one another in any significant way after normalization of the readings; e.g., if we take two different color sensors' CMOS that are attached to the same luminaire in different physical attachment locations on the luminaire fitting, we may expect to receive different absolute light/color intensity readings, such as Red, Green, Blue, and Yellow intensity readings, when compared between the two sensors, due to the different amount and intensity of light received at the two physical locations and any differences between the two sensors. However, the normalized values read by each individual sensor of the percent (%) change in color intensity will have a very close, negligible difference. For instance, we may read Red intensity at time t1 respectively as x1 and y1 for each sensor. At t2, we read x2 and y2 respectively. Then $x2/x1=y2/y1+w$ where $w\ll 1$ (for example, where w is very small). Embodiments in accordance with this disclosure thus allow for an exponential relationship between color intensity measurements and lumen intensity of the LED. This relationship is known/calculated by the server 106 in the exemplary disclosed systems and methods.

In addition, different types of luminaires emit light having different color/light intensity. In the exemplary embodiment shown in FIG. 3, the system includes a color sensor directly facing the luminaire 112. The color sensor may measure the color/light intensity of the light emitted by the particular luminaire 112/LED 111 to which it is attached. Thus, differences in light emission may be normalized regardless of the type of luminaire. This makes the exemplary disclosed systems dynamic—i.e., automatically adaptable to, among other things, changes in the number, type, and/or dimming level(s) of luminaires in the lighting system.

Figure 6A:
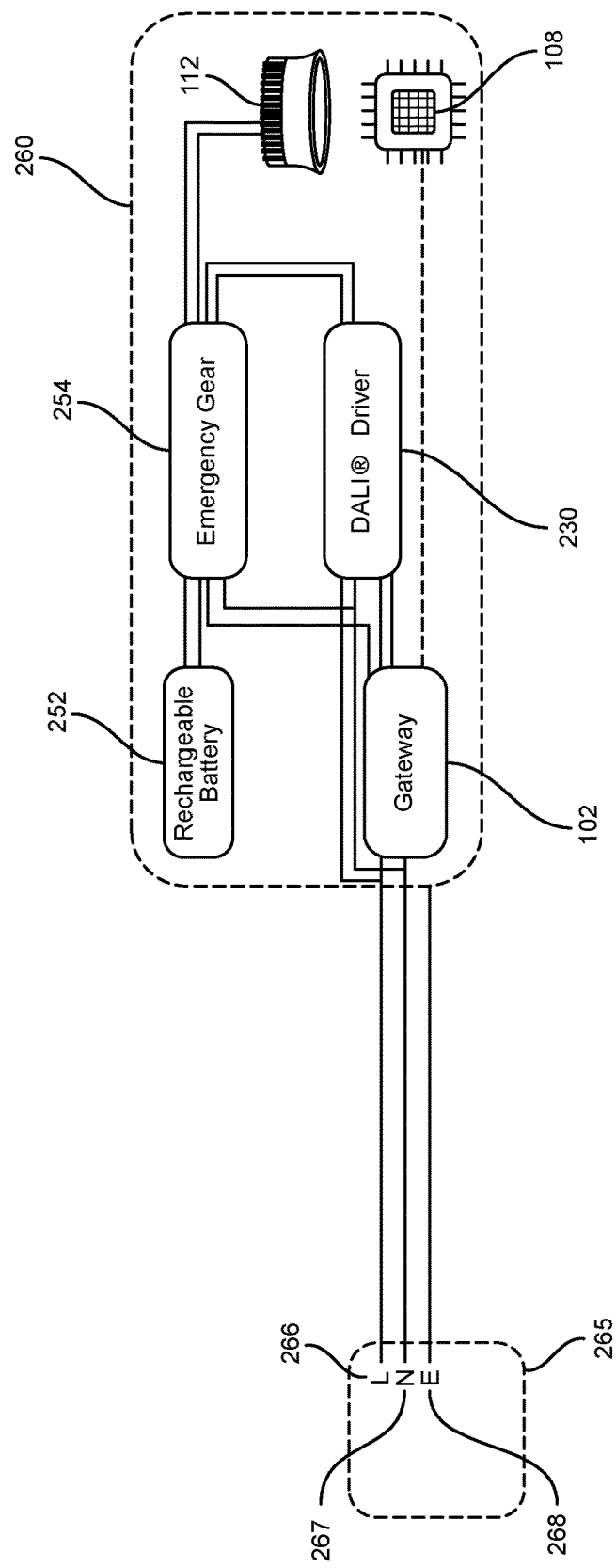
FIG. 6A is a 3 core initialization with DALI® driver, according to an aspect.
Figure 6B:
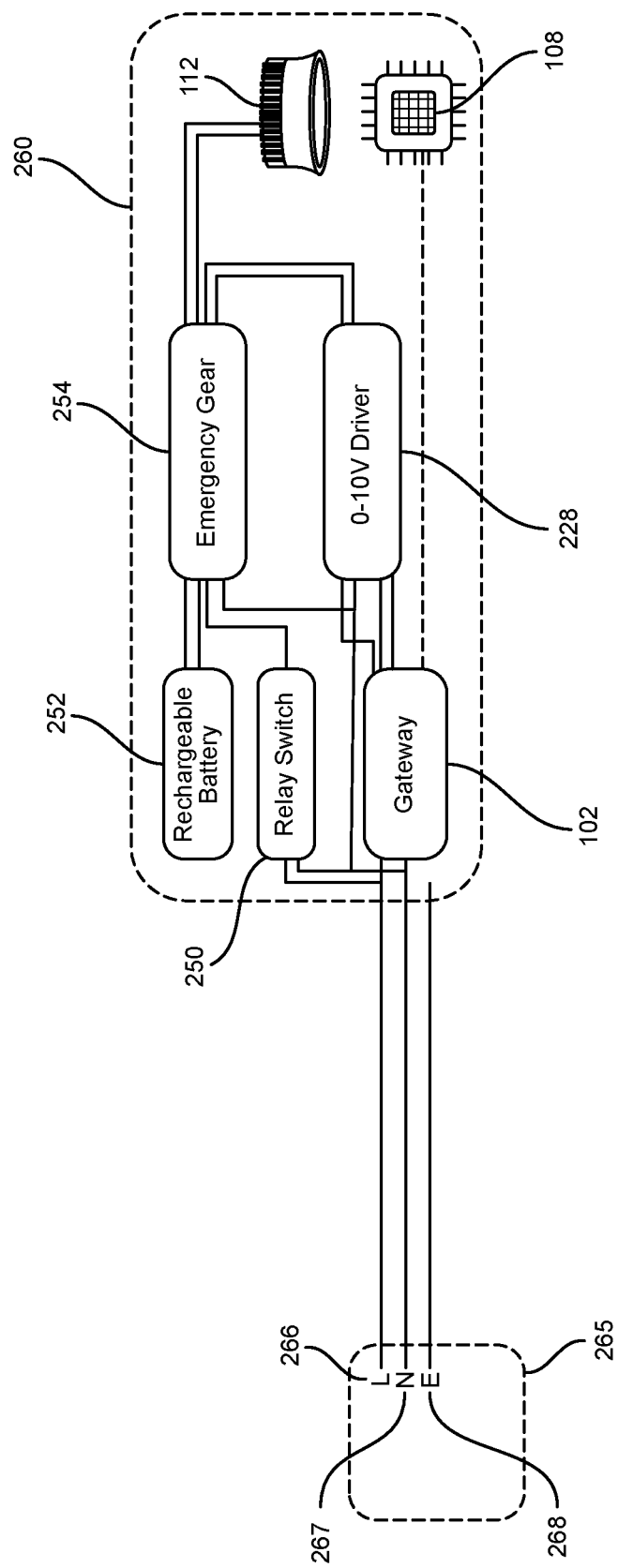
FIG. 6B is a 3 core initialization with Analogue driver, according to an aspect.
Figure 6C:
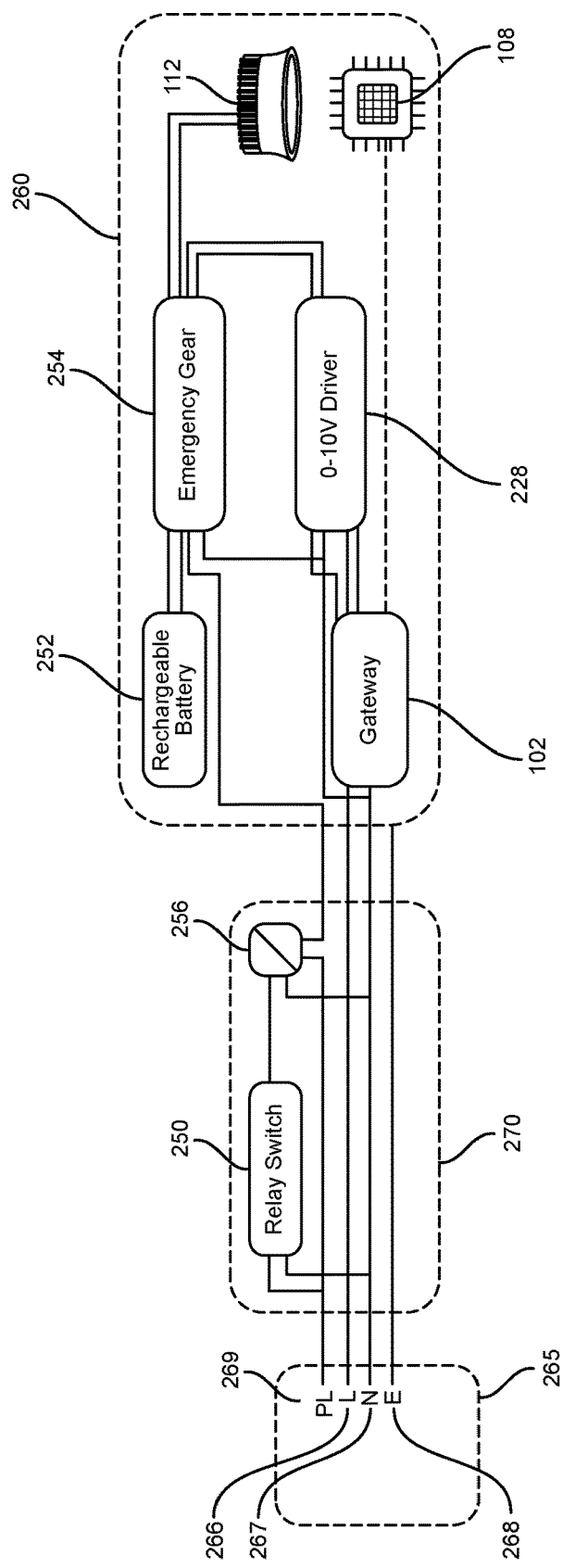
FIG. 6C is a 4 core initialization with Analogue driver, according to an aspect.

With continuing reference to FIG. 3, in an exemplary embodiment of an emergency lighting system self-test, the system automatically cuts off power to each luminaire 112/LED 111 through the gateway 102 by software implementation, thus initiating power to the luminaire 112 via an emergency, inbuilt, backup power source (e.g., rechargeable battery 252, FIGS. 6A-6C). The emergency power source in each luminaire 112 is checked via the sensor subsystem 108 to ensure that the luminaire 112 is emitting a requisite amount of light for a requisite amount of time. Further, information collected by the sensor subsystem 108 from one or more of the emergency lighting system self-tests is transmitted to the cloud servers 106, either directly or through gateway 102, and the cloud servers 106 are configured to calculate an end of life expectancy for the luminaire 112 based at least in part on information from the sensor subsystem 108. In addition, the total charging time, discharging time, and power consumption of a rechargeable emergency power source, such as a battery, and the power consumption of the luminaire 112 may be measured during the emergency self-test, e.g., by power meter 114, and transmitted to the cloud servers 106 either directly or via the gateway 102. The cloud servers 106 are configured to determine whether the rechargeable emergency power source is sufficient to power the luminaire 112 to act as an emergency lighting fixture. Exemplary emergency self-tests and predictive functions are described in detail further below.

In another aspect, the system automatically cuts off power to the luminaire 112 through the at least one gateway 102 by hardware implementation to initiate an emergency self-test. The hardware implementation may include, for example and without limitation, at least one timer and/or sensors/sensed data that may initiate the test.

In an aspect of the exemplary disclosed embodiments, emergency self-tests may be performed at an optimum time when a minimum number of people, or no people, are present or expected in the testing area for the duration of the test. The optimum time may be determined, for example, by downward facing environment sensors that measure motion and footfall through the testing area and provide either current or historic information regarding the time(s) when the number of people passing through the testing area is at a minimum. In addition, information regarding the time required for the discharge/charge cycle of, e.g., a rechargeable emergency power source may be used to determine how long the lighting system needs to perform the test before the emergency power source is sufficiently recharged and a sufficient amount of light returns to the testing environment. Thus, the exemplary disclosed systems and methods may reduce the total amount of time required for the test based on actual lighting capacities and not arbitrary testing procedures. Reducing the required time for the test allows people to return sooner to the testing area.

Figure 4:
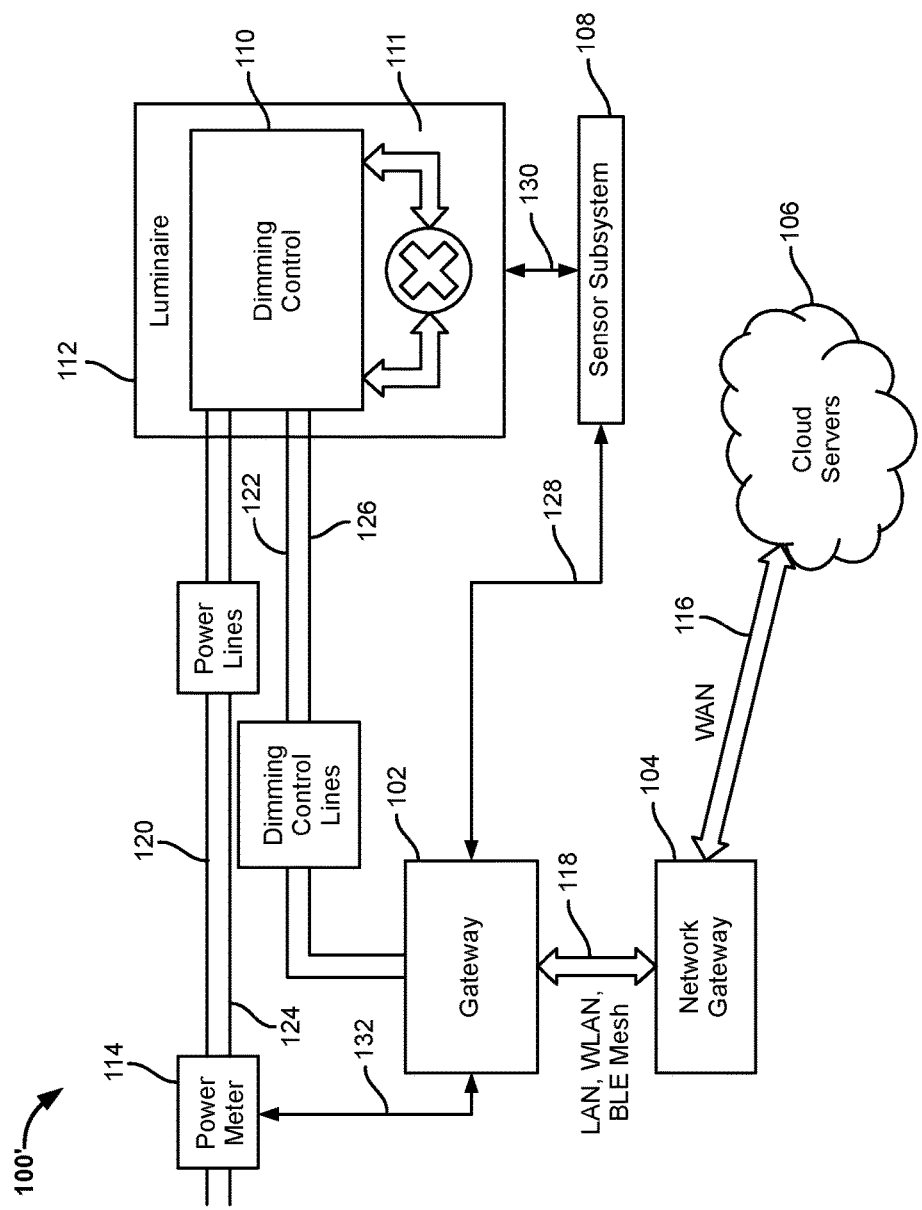
FIG. 4 is a high-level system diagram of the gateway with dimming control protocol, according to an aspect.

With reference now to FIG. 4, another exemplary embodiment of a system 100' is shown including at least one luminaire 112 and/or LED 111 configured to communicate with at least one gateway 102 such as a USLG, at least one dimming control 110 configured to control at least one of a dimming level or dimming protocol of the luminaire 112/LED 111, at least one sensor subsystem 108 configured to sense color/light intensity of the luminaire 112 and monitor at least one aspect of the environment in real time, at least one power meter 114 configured to measure power consumption by the luminaire 112 in real time, and at least one server such as cloud servers 106. In the same or other embodiments, the server may be a local server, hosted server, or any other server consistent with this disclosure. In the exemplary embodiment, each luminaire 112 and/or LED 111 includes at least one luminaire driver and/or LED driver (not shown). The dimming control 110 is controlled by the gateway 102 and/or the cloud servers 106 as explained further below. The sensor subsystem 108 and power meter 114 are each connected with each of the gateway 102 and the luminaire 112. The at least one sensor subsystem 108 includes at least two sensors. One sensor is an environment sensor dedicated to environment sensing, and may be arranged such that it faces away from and/or extends in a downwardly fashion, from the luminaire 112. A second sensor is an upward facing sensor that faces the luminaire 112 directly. In the exemplary disclosed embodiments, the upward facing sensor is a color sensor such as a Red, Green, Blue (RGB) sensor or Yellow, Red, Green, Blue (YRGB) sensor. In an exemplary embodiment, the cloud servers 106 are connected with the gateway 102 via a backhaul interface 118 explained further below. In the exemplary embodiment, the gateway 102 is configured to discover the at least one dimming control protocol installed in the luminaire 112 and controlling the dimming protocol and/or dimming level of the luminaire 112 via dimming control 110. Further, the gateway 102 may be capable of controlling the power to the luminaire 112 and is capable of dimming the luminaire to zero (0) or shutting it off completely.

According to an aspect, the at least one server 106 is configured to calculate and predict depreciation of the dimming levels of the luminaire 112/LED 111. In the exemplary embodiment shown in FIG. 4, the sensor subsystem 108 may be configured to report a change in measured information relative to a variable, such as an operating parameter, on a display device associated with the luminaire 112 and configured to display, e.g., to a user, information regarding the operating parameter(s) of the luminaire 112. The sensor subsystem 108 and the power meter 114 are each connected with the gateway 102 and luminaire 112 via physical and/or wireless connections. The luminaire 112 is physically and/or wirelessly connected to the gateway 102 via dimming control 110.

In another aspect, and in accordance with the disclosure herein, each luminaire 112/LED 111 may be configured to act as an emergency lighting fixture during a mains power outage to the luminaire 112/LED 111. As further described herein, the system 100' is further configured to predict when an emergency light fixture will not meet a minimum lumen level/lux and to adjust a dimming protocol and/or dimming level of the emergency light fixture to meet the minimum lumen level/lux and/or maximize the life of the luminaire 112. The system 100' is also configured to test an emergency light fixture in an environment that otherwise contains ambient light. The system 100' is additionally configured to identify which emergency light fixtures are showcasing accelerated failure modes and review what parameters could be causing said failure modes. The system 100' is configured to perform self-tests and predict emergency lighting fixture life expectancy for non-maintained, maintained and smart emergency fixtures.

In the exemplary disclosed embodiments, a single gateway may accomplish the above functions and features, among others, and control operation of the luminaire/emergency lighting fixture in a variety of wiring installations with a variety of dimming control drivers. In one exemplary configuration, a relay may turn off a permanent live power supply to the luminaire, to simulate a mains power outage (emergency) situation. The gateway may separately control the dimming (for dimmable fixtures) and other emergency test functions/measurements. The dimming control driver(s) and associated protocols may be digital (i.e., DALI®) and/or analogue (i.e., 0-10V). The exemplary configuration requires only a single, permanent live power supply to the gateway. Typically, current emergency fixture setups may require at least two live power supplies (i.e., permanent and switched) to respectively control the on/off state of a luminaire and the switch to emergency power. In addition, typical emergency fixture setups are specific to particular wiring installations and dimming control drivers.

The exemplary systems and methods further include a sensor subsystem including at least one upward looking sensor configured to face a luminaire directly and measure a color/light intensity of the light emitted by the luminaire. The upward looking sensor and/or a combination of the upward looking sensor and other sensors may provide information regarding relative light emissions from the luminaire on which emergency self-test and predictive determinations may in part be based.

The gateway 102 may be capable of detecting, communicating and handling/controlling a plurality of dimming protocols via the dimming control 110, and to control the dimming control 110 to provide a plurality of dimming levels to the luminaire 112. The gateway 102 is configured to receive information related the current dimming level of the luminaire 112. Exemplary dimming protocols include, but are not limited to, 0V-10V, 1V-10V, DALI® and digital multiplex (DMX). According to an aspect, both digital and analog protocols and interfaces are included. The type of hardware/wire(-less)/bus interfaces between the gateway 102 and the dimming control 110, e.g., the number of wires, the type of wires, wireless protocol, or bus connectors is not limited by the disclosure. The dimming control lines 122, 126 may be analog interface control wires and/or electrical/digital bus connectors, of any kind, or may be wireless connections.

Figure 11:
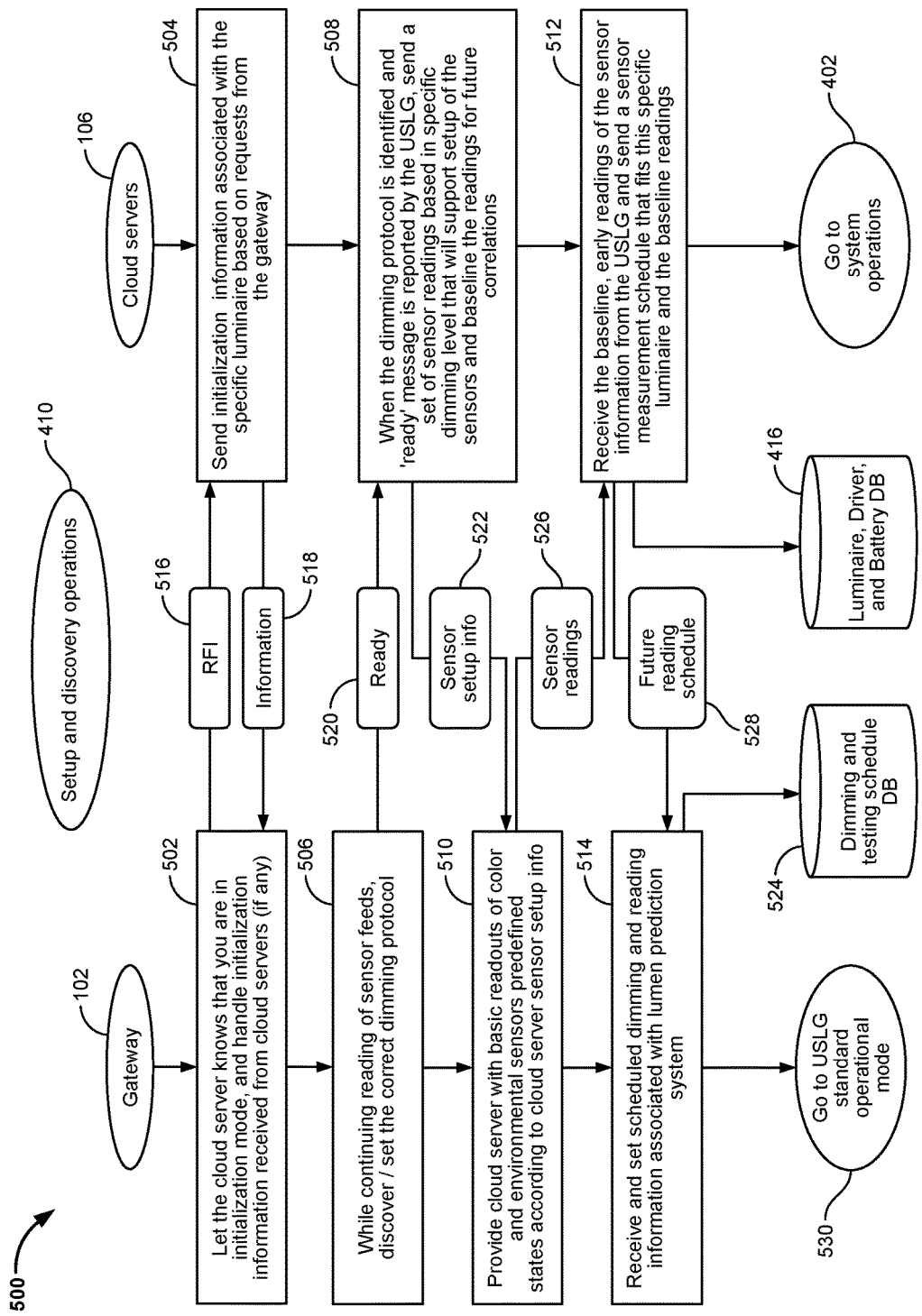
FIG. 11 is a diagram of a system handling a device setup, according to an aspect.

Exemplary embodiments in accordance with the disclosure include a system 100' in which the gateway 102 can control the dimming device 110 and change the dimming level and the color temperature of the luminaire 112 in luminaire devices that allow for color temperature controls. In certain exemplary embodiments, the gateway 102 receives a set of directives or instructions for the dimming control 110 and sensor subsystem 108 setup, protocols, schedules, etc. from the cloud servers 106. Such information may be stored in a database (DB) such as Dimming and Testing Schedule DB 524 (FIG. 11). As discussed with respect to FIG. 11, the Dimming and Testing Schedule DB 524 is a is a database for storing a time schedule for adjusting dimming levels, taking measurements, etc. The cloud servers 106 accesses the Dimming and Testing Schedule DB 524 and transmit a scheduling message including a time to record, for example, the current dimming level and and/or color/light intensity of the luminaire 112. According to an aspect, the sensors of the sensor subsystem 108 can be programmed via the gateway 102 such that they will provide data only under certain conditions, such as where light/color intensity is outside of a predefined range. The gateway 102 may also be controlled such that it executes measurements only when, e.g., environment measurements and/or dimming levels are in a certain range. According to an aspect, the dimming control 110 and sensor subsystem 108 are controlled from outside of the gateway 102 via cloud servers 106 that are connected to the gateway 102. The control described herein allows the system to set up a miniature-controlled environment in which the light intensity of the luminaire 112 can be measured.

In the exemplary embodiment shown in FIG. 4, the system includes a color sensor directly facing the luminaire 112. The color sensor may measure the color/light intensity of the light that the luminaire 112 is emitting. Different luminaires may emit different color/light intensities. The color sensor faces a particular luminaire 112 and provides measurements for that luminaire 112. The sensor subsystem 108 sends the measurements for that particular luminaire 112 to the cloud servers 106 either directly or via the gateway 102, for processing, etc. Thus, the exemplary system may dynamically normalize the color/light intensity of different luminaires across a lighting system.

With continuing reference to FIG. 4, in an exemplary embodiment of an emergency lighting system self-test, the system automatically cuts off power to each luminaire 112/LED 111 through the gateway 102, by software implementation, thus initiating power to the luminaire 112 via an emergency, inbuilt, backup power source (e.g., rechargeable battery 252, FIGS. 6A-6C). The emergency power source in each luminaire 112 is checked via the sensor subsystem 108 to ensure that the luminaire 112 is emitting a requisite amount of light for a requisite amount of time. In addition, the gateway 102 collects information regarding the dimming level of the luminaire 112 during the test. Information collected by the sensor subsystem 108 and gateway 102 from one or more of the emergency lighting system self-tests is transmitted to the cloud servers 106, and the cloud servers 106 are configured to calculate an end of life expectancy for the luminaire 112 based at least in part on information from the sensor subsystem 108. In addition, the total charging and discharging time and power consumption of a rechargeable emergency power source, such as a battery, and the power consumption of the luminaire 112 may be measured during the emergency self-test, e.g., by power meter 114, and transmitted to the cloud servers 106 either directly or via the gateway 102. The cloud servers 106 are configured to determine whether the rechargeable emergency power source is sufficient to power the luminaire 112 to act as an emergency lighting fixture. The cloud servers 106 are also configured to determine, e.g., end of life expectancy and sufficiency of the emergency power source at one or more dimming levels, based at least in part on dimming level information from the gateway 102. Exemplary emergency self-tests and predictive functions are described in detail further below.

In another aspect, the system 100' automatically cuts off power to the luminaire 112/LED 111 through the at least one gateway 102 by hardware implementation. The hardware implementation includes, for example and without limitation, at least one timer, at least one relay switch (250, FIG. 5), and sensed data.

In a further aspect of the exemplary system shown in FIG. 4, the cloud servers 106 via the gateway 102 direct the dimming control 110 to conduct the emergency lighting test with the luminaire 112 at one or more dimming levels to verify and/or predict whether the emergency power source is sufficient to power the luminaire 112 at the required amount of light and for the required amount of time at such dimming level(s). The cloud servers 106 are also configured to use information from the emergency self-tests to determine, e.g., the maximum dimming level at which the emergency luminaire 112 will meet the requirements, thereby saving power and maximizing the life of the luminaire 112 and the emergency power source.

In a further aspect of the exemplary self-test embodiments, the light/color intensity output from a luminaire 112 is measured at different points in time during the test and compared to the light/color intensity output from the luminaire 112 at the same point in time from at least one previous test, to calculate a predictive curve for failure of a rechargeable emergency power source that powers the luminaire 112. In the exemplary system 100' shown in FIG. 4, the predictive curve may also be based on the number of charge/discharge cycles the rechargeable power source has undergone, and/or the ambient temperature of the environment. In addition, the system 100' may conduct two or more complete discharge tests in which the rechargeable power source is completely discharged. The amount of light and total discharge time between the two or more tests may be compared to determine a life expectancy for the rechargeable power source.

The system 100' may continuously receive real time performance measurements from the sensor devices of the sensor subsystem 108 via the sensor interface 128, and power measurements from the power meter 114 via the power meter interface 132. According to an aspect, the gateway 102 sends these readings in a compressed format to the cloud servers 106. According to an aspect, the gateway 102 is configured to relay the information collected by the system to the cloud servers 106 for processing, storage, calculating, compilation, comparing, and the like. According to an aspect, the cloud servers 106 include a processor configured to receive and use the information to calculate and predict the life expectancy of the luminaire 112/LED 111 which acts as an emergency lighting fixture, and to generate and relay a life expectancy report to a user. The compressed format may include a baseline message set and an updates message set as discussed further below with reference to FIG. 10. According to an aspect of the exemplary disclosed embodiments, the baseline message set includes all of the readings from the sensor subsystem 108, power level readings from the power meter 114, and the current dimming level from the gateway 102. The updates message set includes changes or differentiations from the previous message set. The baseline message may be sent upon major change, such as a change in the dimming level, while the updates message set may be sent at regular intervals. According to an aspect, the updates message set also includes readings/measurements that are significantly different from the previous set. In certain exemplary embodiments, readings/measurements can be averaged over the time interval between subsequent updates message sets to determine, e.g., a threshold for changes that require an updates message.

The system 100' may include a backhaul interface 118 for connecting the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an exemplary embodiment, the backhaul interface 118 is a Mesh BLE. The communication protocol may include the Mesh BLE. The gateway 102 is thus connected to the back-end network 104 via LAN, WLAN, WAN, Mesh BLE radio network or other techniques. This connection may allow another device (such as a server or processor) on the network local to the gateway 102 or via WAN in the cloud, to handle the predictive calculations and other calculations in accordance with the disclosure. Thus, the predictive calculations and others can be distributed between several devices or on a single device, local or remote to the gateway 102.

With continuing reference to the exemplary system shown in FIG. 4, gateway 102 can interface with other control systems or devices via wired connections, Ethernet connections, wireless connections, or any combination thereof, and can receive control messages that direct the gateway 102 to, e.g., change at least one of a dimming protocol and dimming level of the luminaire 112 via dimming control 110. This interface or plurality of interfaces may be the backhaul interface 118 of the gateway 102. The protocol used in this interface and the interface itself is the backhaul protocol. In the exemplary disclosed embodiments the backhaul protocol is capable of delivering dimming directions to the gateway 102, and receiving sensor readings from the sensor subsystem 108 and power level readings from the power meter 114, via gateway 102.

According to an aspect, the gateway 102 is connected to the network gateway 104, which resides between the local networks and a wide area network (WAN) 116. In an embodiment, the WAN 116 connects the gateway 102 to cloud servers 106 for operational and management interfaces. According to an aspect, the gateway 102 is configured to control at least one of a dimming protocol and a dimming level of the luminaire 112, and is capable of communicating sensor readings from the sensor subsystem 108 and power level readings from the power meter 114 over the wired/wireless network(s) 118, via the WAN 116, to the cloud servers 106 for processing.

In certain exemplary disclosed embodiments, the cloud servers 106 are continuously receiving performance measurements (sensor readings, power levels/consumption, dimming levels, etc.) via the gateway 102. In the same or other embodiments, the cloud servers 106 provide the gateway 102 with a table of sensor reading directions that includes sensor reading thresholds for specific dimming levels of the luminaire 112. According to the sensor reading directions, the sensor subsystem 108 will only transmit color/light intensity measurements from the luminaire 112 if the measurements are outside of the sensor reading thresholds for the current dimming level of the luminaire 112. Using this method, the system 100 may reduce the amount of information that is transmitted over the gateway 102 and backhaul interface 118. Thus, the cloud server applications can control the rate of information sent by the gateway 102.

In certain exemplary disclosed embodiments, the system 100' sends sensor readings and other information over the backhaul 118 to the cloud servers 106 at random times. According to an aspect, this allows for better utilization of the backhaul 118, which may be a wireless mesh network with limited backhaul capacity. In an embodiment, a message being sent at random time periods during the day will include a correct time stamp of the measurement/reading (at the time the measurement reading is taken—not when the information is received at the cloud servers 106) and the dimming level of the luminaire 112 at the time of the measurement/reading.

Figure 5:
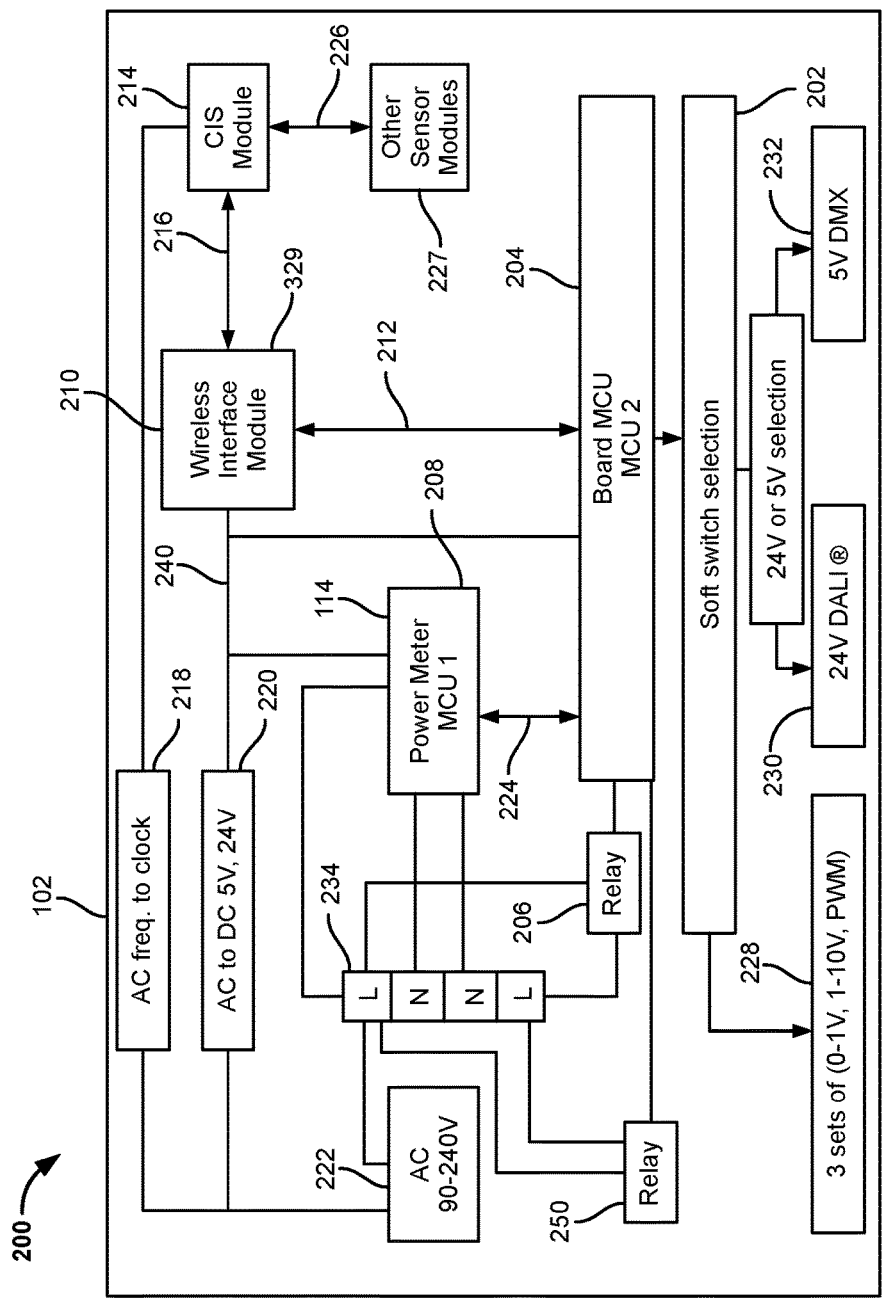
FIG. 5 is a gateway box diagram, according to an aspect.

FIG. 5 depicts an illustrative embodiment of the gateway 102. According to an aspect, a soft switch 202 to select between different electrical dimming interfaces is provided. The soft switch 202 may be actively used to search for the correct protocol between the gateway 102 and the luminaire 112 in embodiments where the luminaire 112 is a dimming luminaire 112. According to an aspect, protocol modules 228, 230, and 232 are the software implementation of the dimming interfaces that reside in the gateway 102. In an embodiment, the supported dimming protocol includes several sets of protocols, such as, for example, 0V-10V, 1V-10V, pulse width modulation (PWM) 228 protocols over 0V-10V and/or 1V to 10V, a 24V DALI® 230 protocol, and a 5V DMX 232 protocol. The protocols may include algorithms that are implemented in a Micro Controller Unit 2 (MCU 2) 204. According to an embodiment, the MCU 2 204 is powered by the AC to DC 5V, 24V 220 via a power line connection 240. MCU 2 204 may also be connected to a power meter 114 via a Micro Controller Unit 1 (MCU 1) 208 and a Universal Asynchronous Receiver/Transmitter 224 (UART 224). MCU 2 may also be connected to a Relay 206 and/or Relay 250, and/or a Wireless Interface Module (WIM) 210 via a Serial Peripheral Interface (SPI) bus 212. In an embodiment, the MCU 2 204 also controls the Relay 206 and Relay 250, which may be designed to cut off/block the current to the luminaire 112 upon a decision by the MCU 2 204. The power cutoff can be used to disconnect power from the controlled luminaire 112 subsystem. In an exemplary embodiment, the WIM 210 is implemented as a Bluetooth Low Power (BLE) device using Mesh BLE protocol to connect with other devices, as well as having the SPI bus 212 and an Inter-Integrated Circuit two-wire serial interface bus (TWSI) 216. The WIM 210 may be connected to a sensor subsystem that may include a Camera Interface System (CIS) 214, which may include, for instance, an environment sensor and a Red, Green, Blue (RGB) sensor and/or a Yellow, Red, Green, Blue (YRGB) sensor combination device, and other sensors, as discussed further below. The CIS module 214 can be extended via a TWSI bus 226 with other sensor modules. The CIS module 214 may require a clock, which is received via the AC Frequency to a clock module interface 218. The WIM 210 may require power, which may be received via the AC to DC 5V to 24V 220 via power interface line 240. According to an aspect, an AC Power 90V-240V 222 may be relayed to the MCU 2 204 via a Line Control (LNNL) 234, and relayed from the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 5, and according to an aspect, depicts the physical electrical line connections.

According to an aspect and as illustrated in the exemplary embodiment shown in FIG. 6A, the at least one dimming protocol module is a 24V DALI® driver 230. For a 24V DALI® driver 230, the emergency lighting fixture system 260 requires only one gateway 102. The exemplary emergency lighting fixture system 260 includes a rechargeable battery 252 as the emergency power source. The rechargeable battery 252 may be attached to the luminaire 112 or inbuilt, printed on a circuit board connected to the luminaire 112, or otherwise connected to the luminaire 112 in a manner consistent with this disclosure. Further, the system includes emergency gear 254 including at least one charging device for the rechargeable battery 252. The charging device may be any component that conditions or converts the permanent live (AC) power supply 265 from the gateway 102 for use by the rechargeable battery 252. The power supply 265 includes live line 266, neutral line 267, and earth line 268. The charging device need not be a DALI® device for automatic testing/reporting. The rechargeable battery 252 is also connected to the gateway 102, luminaire 112, and power supply 265 through emergency gear 254. Thus, in the exemplary embodiment shown in FIG. 6A, a separate power supply to the emergency gear 254 is not required. The gateway 102 is also connected to the sensor subsystem 108 to receive/control sensor measurements and operations. A system such as shown in FIG. 6A may make new lighting installations more cost effective because only one permanent live power line is required.

In an aspect and as illustrated in the exemplary embodiment of a lighting fixture system 260 shown in FIG. 6B, the at least one dimming protocol module is an analogue driver which is a 0-10V driver 228. If an analogue driver is used in place of a DALI® driver 230, an additional relay switch 250 is required because the emergency gear 254/charging device and 0-10V driver 228 require switching capability. The charging device need not be a DALI® device for automatic testing/reporting. A separate permanent live power supply is not required for the charging device.

In an aspect and as illustrated in the exemplary embodiment of a lighting fixture system 260 shown in FIG. 6C, the at least one dimming protocol module is an analogue driver which is a 0-10V driver 228 in a 4 core installation. A permanent live 269 is isolated by a way of a contactor 256 driven by a relay switch 250 in a contactor subsystem 270 to automatically initiate emergency luminaire function. Thus, when there are four cores present, the system eliminates the need for two gateways per emergency lighting fixture because the 0-10V driver may be switched via the power supply from gateway 102, and the emergency gear 254/charging device may be switched via the permanent live from contactor subsystem 270/contactor 256. The charging device need not be DALI® device for automatic testing/reporting. A separate, direct live power supply is not required for the charging device.

Figure 7:
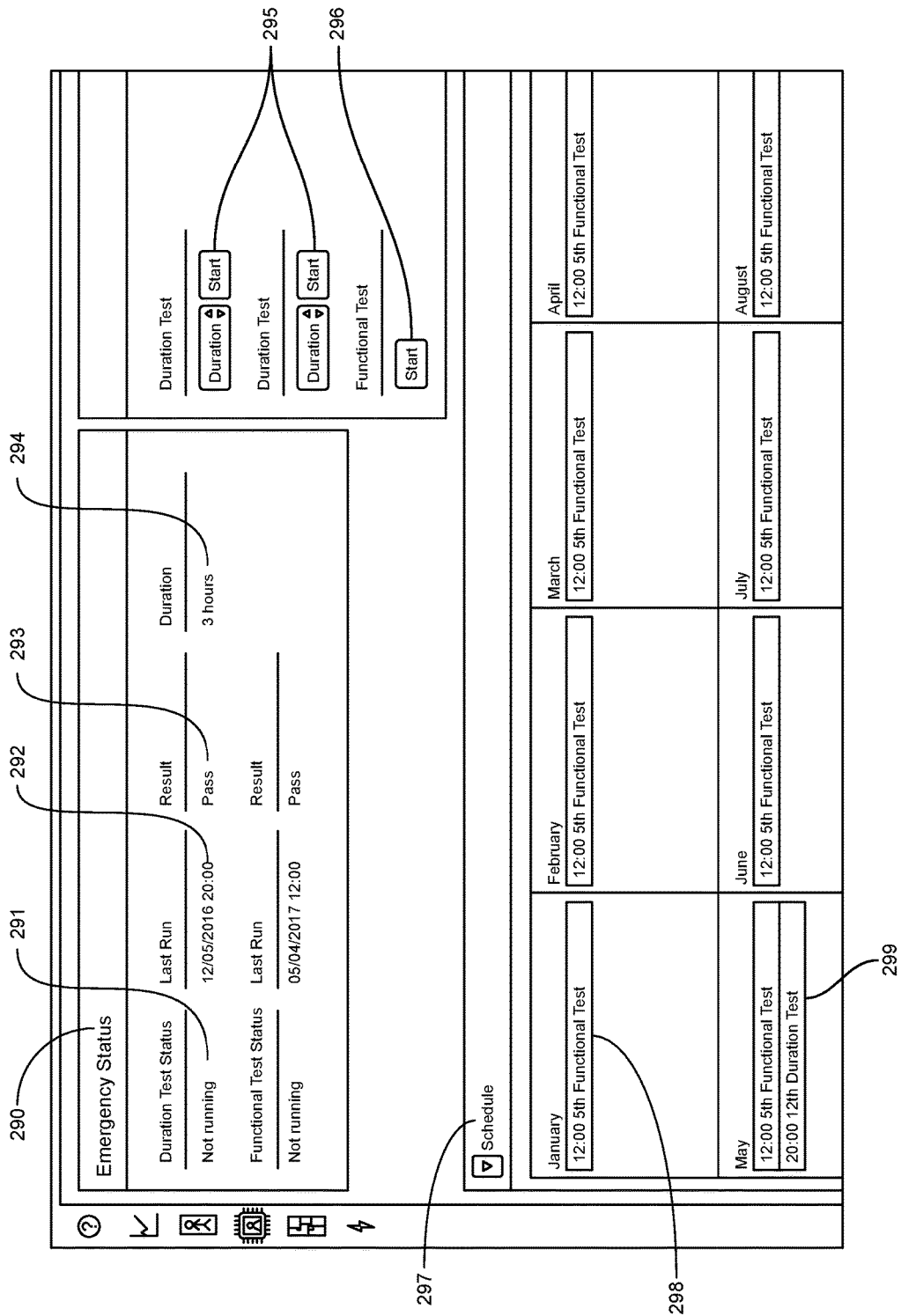
FIG. 7 illustrates the schedule of the monthly and yearly self-tests managed by the system according to an aspect.

With reference now to FIG. 7, an exemplary display is shown including an exemplary monthly 298 and yearly 299 self-test schedule 297 managed by the exemplary disclosed systems. The exemplary display also includes emergency status information 290 such as the status 291 of any tests that are currently running (or not), the duration 294 of a current or previous duration test, and information regarding previous tests such as the date/time of the last test 292 and the result of the test 293. The exemplary display further includes controls 295, 296 for respectively setting a test duration, starting a duration test, and starting a functional test.

During the functional testing, the exemplary disclosed systems and methods determine whether an emergency lighting fixture can meet a minimum required emergency lux level. During the duration testing, the exemplary disclosed systems and methods determine whether an emergency lighting fixture can maintain a minimum required emergency lux level for a required amount of time. For example, an upward facing/color sensor of sensor subsystem 108 faces an emergency lighting luminaire directly and measures the color intensity of the light that the luminaire emits during the emergency test. In an embodiment, the color sensor is an RGB sensor that measures red, green, and blue color intensities. The color intensities are correlated to a lux level at the fixture/luminaire which is then correlated to a floor lux, which is generally the lux level in the environment and/or at a floor in the environment. As an example, if red, green, and blue color intensities respectively equal 700, 800, and 650, this may equate to 5,000 lux at the fixture and a floor lux of 20, as determined during commissioning of the lighting system. In this example, and according to the exemplary disclosed predictive methods, when the lux at the fixture is predicted to drop to 250 lux (i.e., 5000/20) it will breach a floor lux of 1 lux, which may be a minimum floor requirement according to applicable regulations. As the tests are done monthly according to the exemplary schedule shown in FIG. 7, the system accumulates tracking coordinates (i.e., lux levels of the fixture) for an end of life prediction for the emergency lighting fixture. Another lifetime indicator is the lux at the fixture at the start and the end of monthly, annual, and/or total discharge tests which will give an indication of any battery power tail off during the testing time period.

Figure 8:
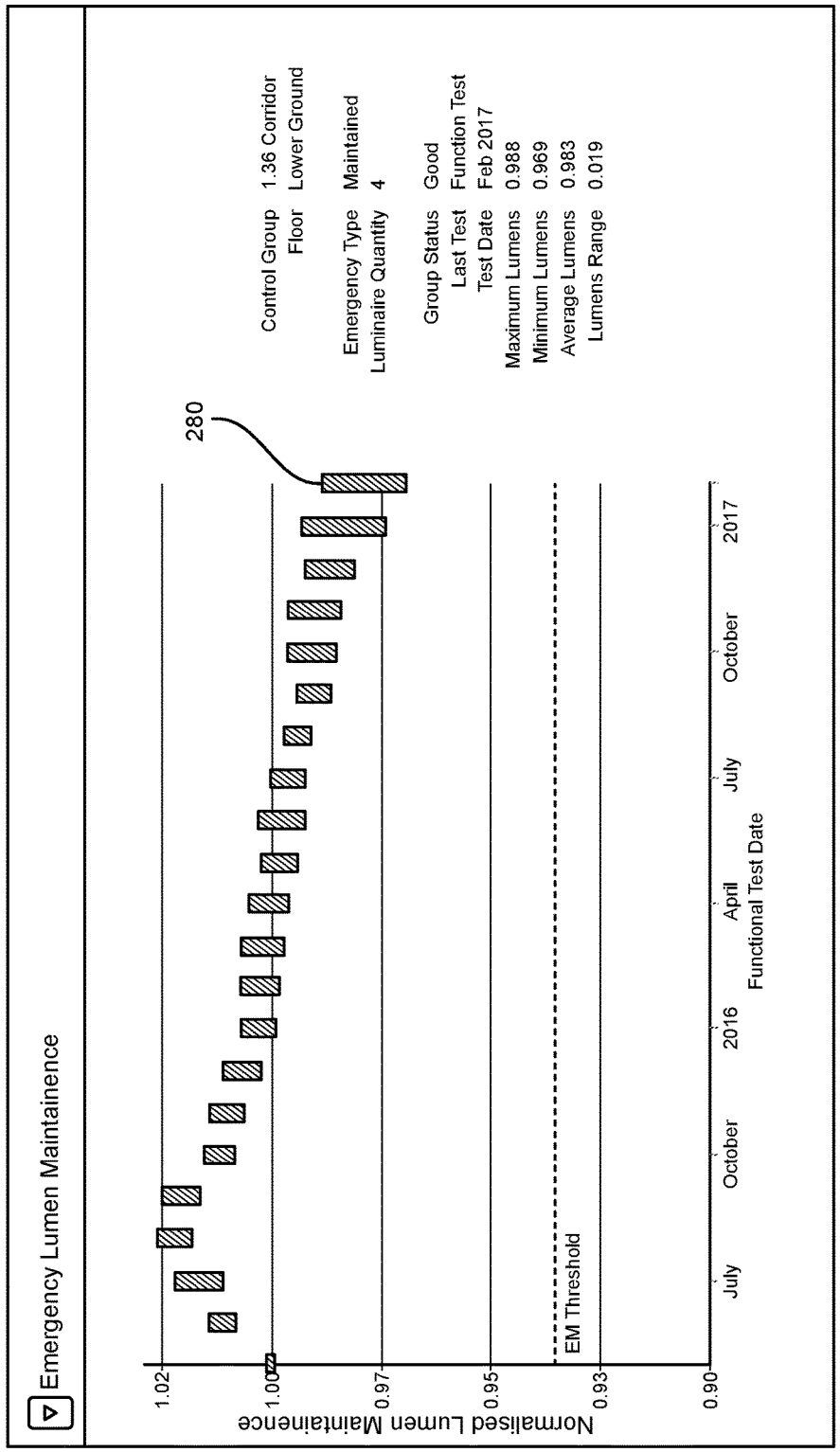
FIG. 8 is a graph analyzing the shift of Lux from each fixture over its lifetime versus other emergency light fixtures according to an aspect.

For multiple emergency fixture/site predictions, the lux shift of each fixture over its lifetime versus other emergency light fixtures is analyzed to track trends on end of life predictions and identify the root cause of relatively early fixture failures, as shown in FIG. 8. The exemplary graph shown in FIG. 8 shows a number of emergency fixtures being tracked and reported upon, where the bars 280 are the maximum and minimum lumen maintenance of each emergency fixture over time. Thus, the performance of different emergency fixtures can be compared and the location, supplier, environment, running data, etc. for each fixture can be considered in determining root cause of poor performance.

Figure 9:
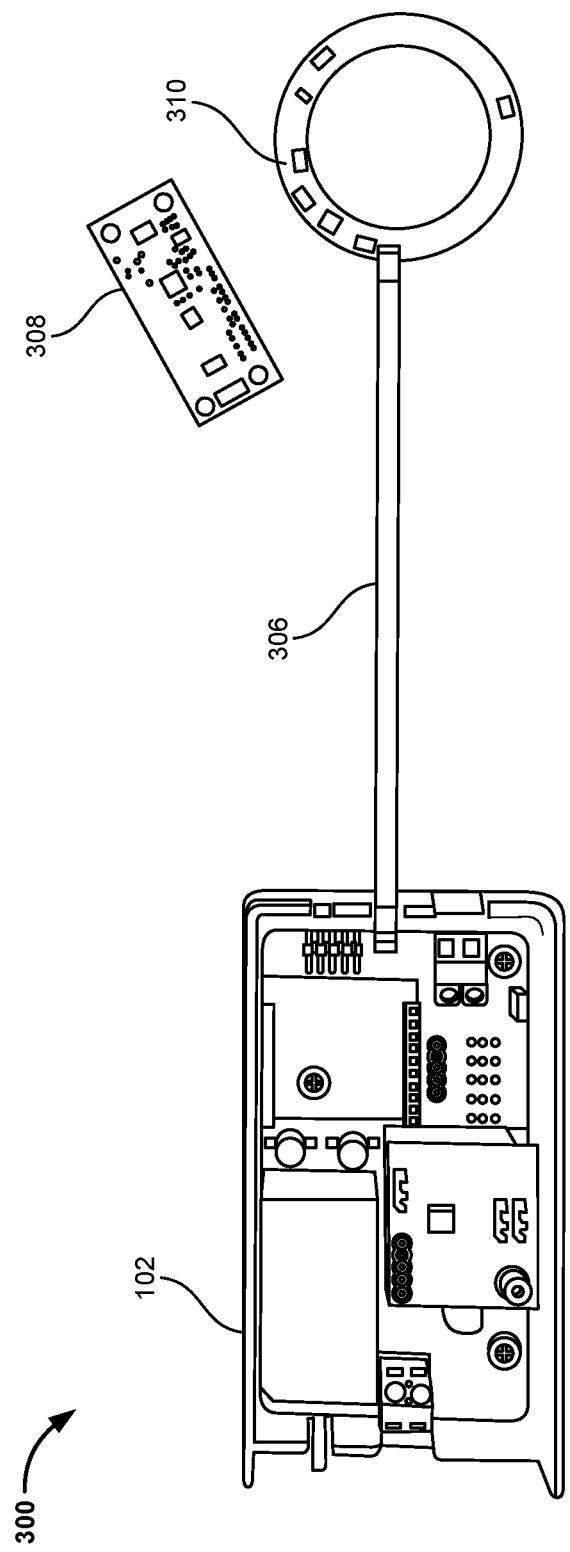
FIG. 9 is a diagram of a sensor connection to a luminaire, according to an aspect.

According to an aspect and as illustrated in FIG. 9, the system 300 may include one or more sensors, typically configured as CIS modules connected to the gateway 102. FIG. 9 illustrates an exemplary embodiment that includes at least one of a first CIS module 308 and a second CIS module 310. While only one connection is depicted in FIG. 9, one or both CIS modules 308, 310 may include a physical interface with the gateway 102 via a TWSI connection that uses a 6 or 8 pin FPC cable and connector 306, or may be in wireless communication with the gateway 102 using, for example, Mesh BLE. The CIS modules 308, 310 may also be physically connected to the luminaire 112. According to an aspect, the CIS module 308 is a linear module that can be adapted to fit on devices that require a linear fitting. In an embodiment, the CIS module 310 is circular, and may be designed to fit circular-shaped luminaires 112.

In an embodiment, each of the CIS 308 and 310 may be provided with at least two or more sensors forming part of the sensor subsystem 108. One sensor is an environment sensor dedicated to sensing parameters of the environment in which the luminaire 112 or other components of the system 100/100' are installed. In an exemplary embodiment, the environment sensor is configured to face away and/or extend in a downwardly fashion from the luminaire. A second sensor may be a color sensor, for example a Red Green Blue (RGB) sensor or Yellow Red Green Blue (YRGB) sensor, configured to face in an upward direction towards the luminaire 112 directly. The combination of the environment sensor and the color sensors may be combined into a single ASIC or may be arranged as separate devices. According to an aspect, the sensors may also connect with the gateway 102 via wired or wireless connections. Any or all of the sensors may also provide real time measurements and assessments to the gateway 102. In response to the measurements and assessments from the sensors, the gateway 102 may direct the dimming control 110 to change, e.g., a dimming level and/or a color temperature, and RGB/RGBW (Red Green Blue Warm White) color of a luminaire 112 that allows for color temperature and RGB/RGBW color control, to maintain a luminous intensity or color temperature in view of light output from the luminaire 112 or environmental factors that affect the intensity or color temperature.

Figure 20:
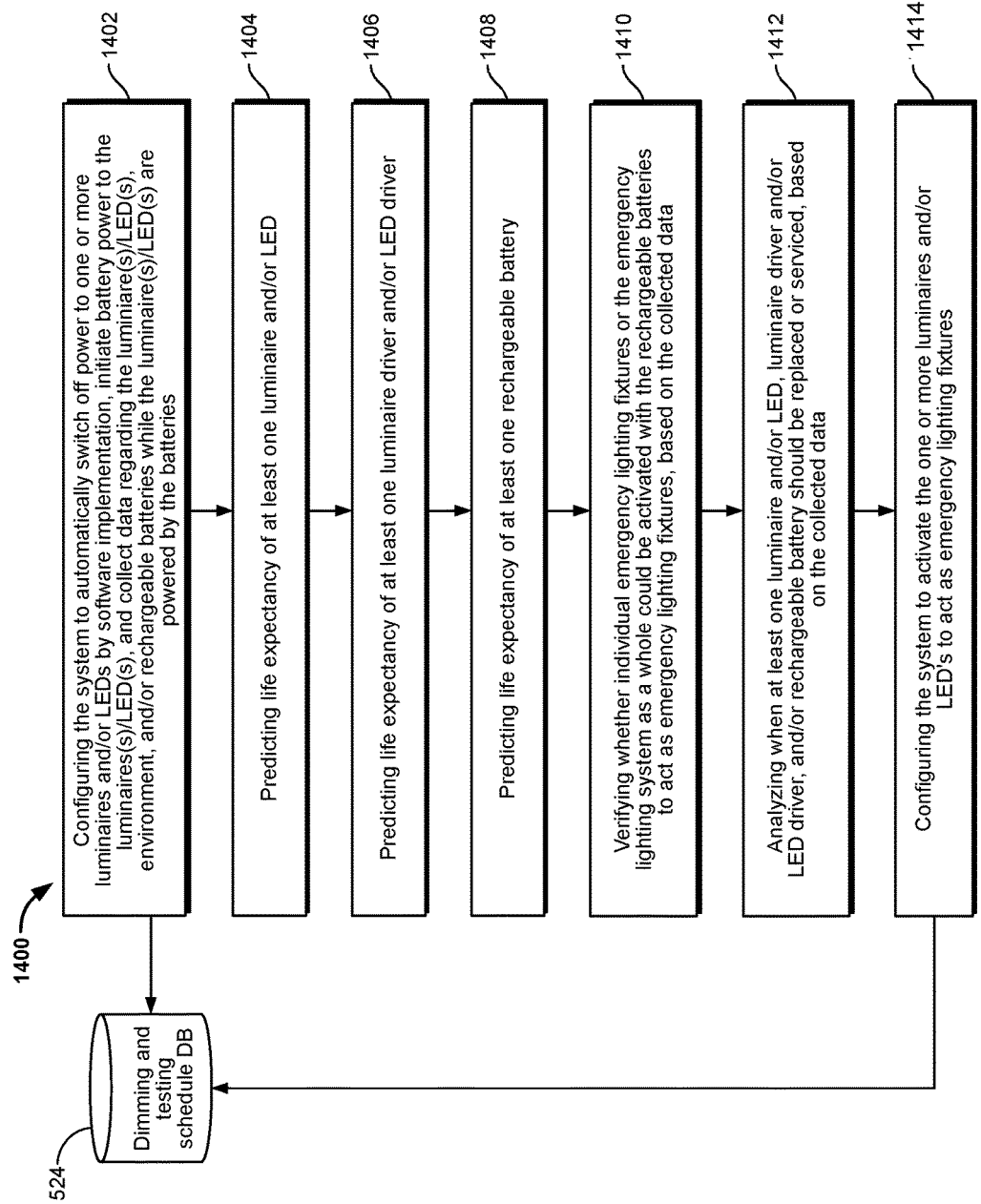
FIG. 20 is a method of predicting emergency lighting fixtures life expectancy according to an aspect.

In general, aspects of the exemplary disclosed embodiments describe a method of predicting emergency lighting fixture life expectancy. FIG. 20 illustrates an exemplary embodiment of a method 1400 of a high level operation of the exemplary disclosed systems. According to an aspect, at step 1402, the system is configured to automatically switch off power to one or more luminaires and/or LEDs by software implementation, initiate battery power to the luminaire(s)/LED(s), and collect data regarding the luminaire(s)/LED(s), environment, and/or rechargeable batteries while the luminaire(s)/LED(s) are powered by the batteries. At step 1404, life expectancy of at least one luminaire and/or LED is predicted. At step 1406, life expectancy of at least one luminaire driver and/or LED driver is predicted. At step 1408, life expectancy of at least one rechargeable battery is predicted. At step 1410, the system verifies whether individual emergency lighting fixtures or the emergency lighting system as a whole could be activated with the rechargeable batteries to act as emergency lighting fixtures, based on the collected data. At step 1412, analyzing when at least one luminaire and/or LED, luminaire driver and/or LED driver, and/or rechargeable battery should be replaced or serviced, based on the collected data. At step 1414, the system is configured to activate the one or more luminaires and/or LEDs to act as emergency lighting fixtures. The data collected during the method 1400 is fed to the Dimming and testing schedule DB 524 (FIG. 11).

In an aspect, the exemplary disclosed embodiments include a method of predicting the half-life of a luminaire which acts as emergency lighting fixture, based on, e.g., the changes in color/light intensity of the light that the luminaire emits over time. In another aspect, exemplary disclosed embodiments provide a method for the system to identify and control at least one of a dimming protocol and dimming level of one or more luminaires over time. The method may include detecting/measuring with one or more sensors information regarding the luminaire associated with the dimming level and/or the environment in which the luminaire is installed. In certain exemplary embodiments, the associated sensors are communicatively connected to at least one gateway which is capable of controlling the dimming level of the associated luminaire. The exemplary disclosed methods may further include communicating information from the sensors, either directly or via the gateway, to one or more processing/storage devices such as, for example and without limitation, servers, databases, and/or processors, for storage, processing, etc. In certain exemplary embodiments, the gateway forwards information from the sensors over wired/wireless networks including at least one WAN to cloud servers. In the same or other embodiments, the information includes power readings from a power meter measuring power consumption by the luminaire.

The exemplary disclosed methods include the recording in memory of information received from one or more sensors and associated with color/light intensity of a luminaire/light source and/or the environment in which the luminaire/light source is installed, wherein the sensors can be a combination of at least one environment sensor and one color sensor. The color sensor may sense the color/light intensity of a luminaire while facing the luminaire and the environment sensor may detect/measure aspects of the environment by facing away from or in a downward direction from the luminaire.

Certain exemplary disclosed methods may further include interfacing by the gateway 102 with one or more control systems and/or devices via at least a wired connection, an Ethernet connection, a wireless connection or a combination thereof. According to an aspect, the gateway receives instructions to control, via a dimming control associated with the luminaire, at least one of a dimming protocol and dimming level of the luminaire via the dimming control. The gateway interface may be a backhaul interface running a backhaul protocol. In an embodiment, the backhaul protocol is responsible for delivering instructions to the gateway to control, e.g., the dimming level of a luminaire. The exemplary methods may further include receiving by the gateway, from one or more sensors, information regarding the color/light intensity of the luminaire and/or the environment in which the luminaire is installed. The gateway may further include various methods and/or known devices for recording/saving received instructions. The method further includes communicating and handling one or more dimming protocols by the gateway via the dimming control. In an embodiment, the dimming protocol may be at least one of a 0V-10V, 1V-10V, DALI®, and DMX digital protocols and analog protocols.

The exemplary methods may also include controlling with the gateway 102 a dimming control device 110 located inside a luminaire 112. According to an aspect, controlling the dimming control may change at least one of a dimming protocol, dimming level, and/or color temperature and/or RGB/RGBW color (for luminaires with such controls) of the luminaire, based on a database of instructions associated with a time schedule. In certain exemplary embodiments, the gateway receives a set of instructions associated with dimming and sensor setups for particular days and/or times of day. The gateway may record/save these instructions and a scheduler may check the instructions on a temporal basis to determine whether any action is necessary.

According to an aspect, certain exemplary disclosed methods further include programming one or more sensors connected to the gateway 102 such that the plurality of sensors will transmit data only when, e.g., the light/color intensity or other aspects of the luminaire 112 or environment are outside of a predetermined range. In the same or other embodiments, the sensors will only take measurements or transmit data when the dimming level of the luminaire 112 reaches, e.g., a certain range within time schedule limitations. The dimming and sensor schedules and/or instructions may be delivered at least in part from outside of the gateway 102 via the server 106, such as a cloud server, connected to the gateway 102. The gateway 102 may be configured to communicate the schedules and/or instructions and/or store them and manage their life cycle.

The exemplary disclosed methods may further include measuring with at least one power meter a real time power consumption of one or more luminaires. The interface between the gateway and the power meter may be a UART or any other known communication interface consistent with this disclosure.

The exemplary disclosed methods may additionally include continuously receiving at the gateway 102 real time performance measurements of the luminaire 112 and/or the environment, from one or more sensors, and power measurements from the power meter 114, which are each connected to the gateway 102. According to an aspect, the gateway 102 compresses and sends these measurements to at least one cloud server 106. The compressed format may include a baseline message set and an update message set. In an exemplary embodiment, the two sets of messages are unique and separate. The baseline message set may include the full sensor readings, power level readings, and a current dimming state of at least one associated luminaire. The update message set may include changes or differentiations from the previous message set. The sensors and/or gateway 102 may further include a method to identify major changes that require a baseline message set to be sent. Such major changes may include, for example and without limitation, a change in the scheduled dimming level and/or a change in the environment that requires a new baseline set. According to an aspect, the gateway 102 includes a method to send the updates message set on regular intervals. The updates message set may include readings that are significantly different from the previous set. In one embodiment, the updates message set is based at least in part on a table of various sensor reading ranges appropriate to a specific luminaire and is provided by the cloud servers 106. In certain exemplary embodiments, sensor readings may be averaged over the time between updates and thresholds for appropriate sensor reading ranges may be based on the averages.

According to a further aspect of certain exemplary embodiments, cloud servers 106 continuously receive performance measurements as described above with respect to the gateway 102. The cloud servers 106 may be configured to correlate the performance measurements with one or more characteristics of the luminaire 112 associated with the performance measurements. The cloud servers 106 may also be configured to determine/predict a lumen degradation profile for the luminaire 112, based on the performance measurements and/or correlations. In the same or other embodiments, the degradation profile may be based at least in part on information from the luminaire manufacturer. The cloud servers may also be configured to predict, e.g., when the luminaire will reach 70% (L70) and/or 50% (L50) performance (i.e., emitted color/light intensity) in its current environment, based on the performance measurements and/or correlations. In certain exemplary embodiments, the cloud servers are configured to determine a lumen degradation profile based at least in part on correlations between performance measurements at different dimming levels of the luminaire, including power consumption of the luminaire. The cloud servers 106 may be further configured to determine, based on the performance measurements and/or correlations at different dimming levels, a dimming schedule that will extend the half-life (L50) of the luminaire 112 while maintaining required or desired luminosity. The cloud servers 106 may be additionally configured to providing reverse predictions in which the half-life of the luminaire 112 is predicted based on the dimming schedule for the luminaire 112 and real-time performance measurements.

Figure 10:
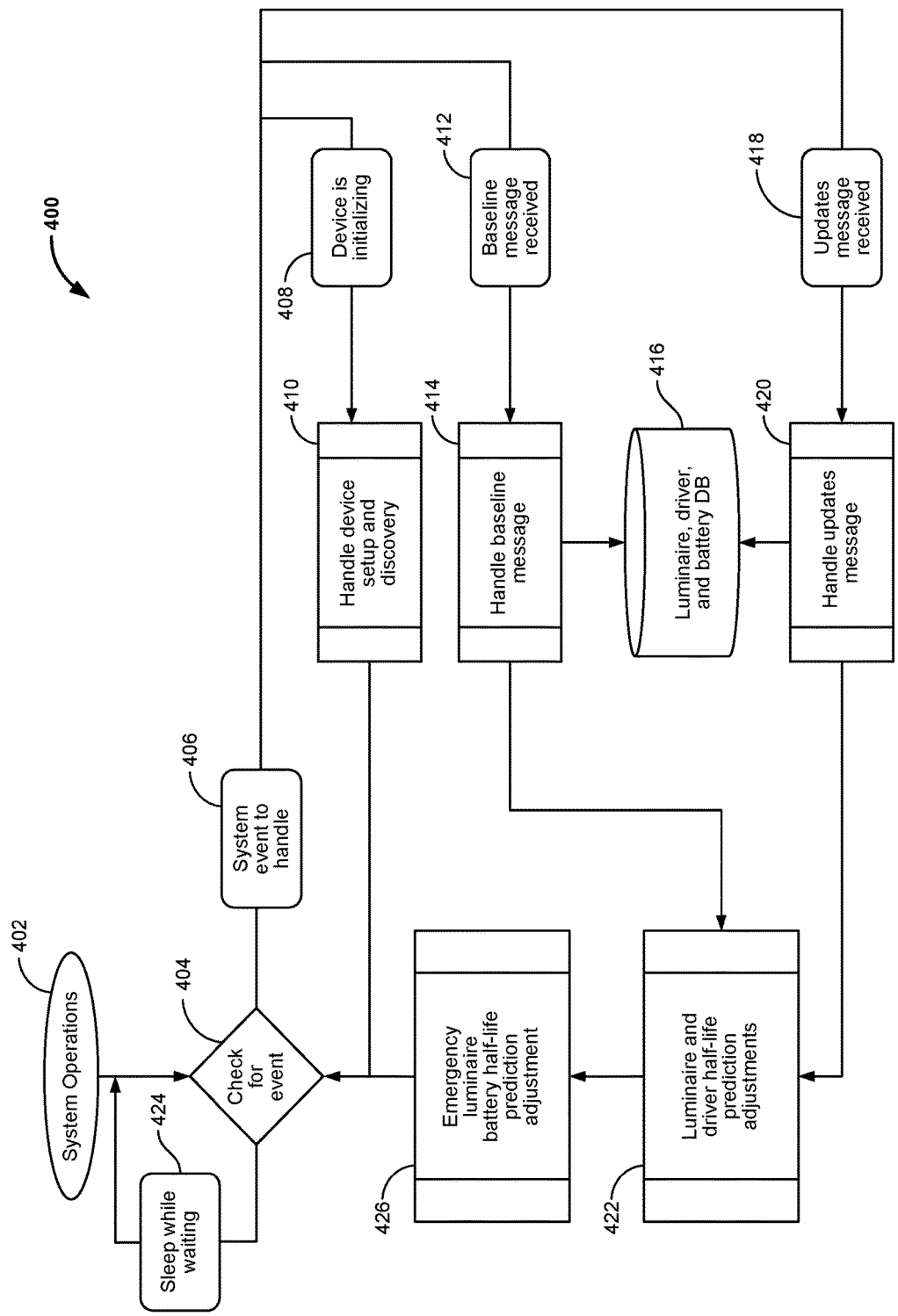
FIG. 10 is a diagram of a system handling a procedural global event, according to an aspect.

FIG. 10 illustrates a flow chart of an exemplary method 400 for high level operations of the exemplary system embodiments. According to an aspect, the exemplary systems are configured to perform various high-level system operations 402 via the cloud servers 106 (see FIGS. 3, 4), and in particular are configured to predict lumen depreciation and/or life expectancy, and to make correlations between the two. According to an aspect, at step 402, initiation of the system operations 402 may begin. The at least one gateway may initialize operation of the system based on at least one communication message exchanged with the server. At step 404, the system checks whether there are events that need to be handled. If the result of step 404 is that there are no events that need to be handled by the system, the operation goes to step 424, during which the system may go back to sleep. If the result of step 404 is that there are events that need to be handled by the system, the operation goes to step 406. At step 406, the system checks different events that need to be handled. According to an aspect, at least three different types of events 408, 412, and 418 may be present. As illustrated in FIG. 10, the events may include a first event at step 408 ("Device is initializing"), a second event at step 412 ("Baseline message received"), and a third event at step 418 ("Updates message received").

At step 408, the system may identify the first event, which may be to initialize and/or handle a current device/luminaire, then move to step 410. At step 410, a new device/a new luminaire may be discovered and properly set up. If the device is already initialized, the system may look for a baseline message at step 412 and/or an updates message at step 418. Thus, at step 412, the system recognizes the second event, which may include receiving baseline messages. The baseline messages include but are not limited to initial settings and/or readings from the dimming control device, sensor subsystem, and/or power meter related to the specific luminaire(s). At step 414, the system may handle the baseline message(s) and simultaneously forward the baseline message(s) to a Luminaire, driver, and battery DB 416 and/or step 422 for luminaire half-life prediction adjustments based on the baseline messages. According to an aspect, the baseline message(s) are collected/recorded in the Luminaire, driver, and battery DB 416, which is a repository to receive and store information from the sensor subsystem and/or power meter and/or aspects of the individual luminaire/LED. At step 422, the baseline message(s) may be used, in conjunction with all other data collected in other steps during operation with the main power supply, to establish and/or update/adjust the half-life and/or end-of-life prediction and requirements for the specific luminaires. At step 426, the baseline message(s) may be used, in conjunction with all other data collected in other steps, to establish and/or update/adjust the half-life and/or end-of-life prediction and requirements for the specific emergency power source such as rechargeable batteries.

The Luminaire, driver, and battery DB 416 is configured to receive and store the information collected from the system and/or luminaires. Alternatively and/or simultaneously, at step 418, the system recognizes the third event, which may include receiving the updates message(s). The updates message(s) include but are not limited to settings and/or readings from the dimming control device, sensor subsystem and/or power meter related to the specific luminaire(s) that are received at a point in time other than the initial settings and/or readings received with the baseline messages, and are essentially updates to previously recorded settings and/or readings. At step 420, the system may handle/process the updates message 418 and then forward the updates message simultaneously towards the Luminaire, driver, and battery DB 416 and/or step 422 for luminaire and driver half-life prediction adjustments. According to an aspect, the updates message is received and recorded in the Luminaire, driver, and battery DB 416. At step 422, the updates message(s) may be used, in conjunction with all other data collected in other steps during operation with the main power supply, to establish and/or update/adjust the half-life and/or end of life prediction and requirements for the specific luminaires. At step 426, the baseline message(s) may be used, in conjunction with all other data collected in other steps, to establish and/or update/adjust the half-life and/or end-of-life prediction and requirements for the specific rechargeable batteries.

After handling incoming messages of any type, such as, for example, the baseline messages or the updates messages (see, for instance, FIG. 13), the measurement updates or changes may be transferred to and recorded in the Luminaire, driver, and battery DB 416. According to an aspect, the Luminaire, driver, and battery DB 416 may also record the handling of the device setup and/or the device discovery. According to an aspect and as found in step 422 and 426, after the handling of the baseline message and the updates message at steps 412 and 418, the system may predict the luminaire half-life or adjust its predictions of the luminaire half-life and batteries based on the updates, and as will be discussed in greater detail herein below with reference to FIG. 14. Changes in the dimming schedule of any luminaire will typically impact the luminaire's half-life expectancy; therefore, over time and based on usage, the predictions will change and become more accurate to the specific point in-time of the measurements.

According to an aspect, the server utilized in the system operations 402 is at least one of a cloud server and a local server. In an exemplary embodiment, the system performs the system operations 402 via only the cloud server (see, for instance, FIG. 11). The cloud server may primarily be in a sleep mode while waiting to check for the presence and/or status of events, or a reactive mode, during which it waits for the occurrence of events. The cloud server may actively/regularly wake up from its sleep mode to check/assess whether any of the events exist 404. According to an aspect, the server manages each of the first, second and third events at different stages/through different processes. According to an aspect, the first event 408 is managed/handled during a set up and discovery process, illustrated in FIG. 10 as 'Handle device setup and discovery' 410. (See also FIG. 11). The second event 412 may occur when a baseline message has been received, and is illustrated in FIG. 10 as 'Baseline message received' 412. The handling of baseline messages/'Baseline Message' types of messages is described in further detail herein below, with particular reference to, for example, FIG. 12. The third event 418 may be associated with the receipt of message updates, and is illustrated in FIG. 10 as 'Updates message received' 418. Creation of updates messages/'Updates Message' types of messages is described in further detail herein below, with particular reference to, for example, FIG. 13.

FIG. 11 depicts an exemplary embodiment 500 of handling of device setup and discovery operations starting at step 410. According to an aspect, the first event after turning on the gateway 102 includes a request for information (RFI) 516 from the gateway 102 to the cloud server 106. This may include asking the cloud server 106 to provide minimal initialization information 518. In an embodiment, if the cloud server 106 is already familiar with the controlled luminaire 112 by this gateway 102, the cloud server 106 may provide more information 518 based on this knowledge/familiarity with the controlled luminaire 112. The cloud server 106 may return an information message 518 to the gateway 102. The types of information messages 518 are not limited by this disclosure. For instance, the information message 518 can include controls that prevent a complete OFF state of the luminaire 112, and forces the system 100/100' to use, instead, a low dimming level. The gateway 102 may set the appropriate dimming protocol for the luminaire 112 and may send a ready message 520 to the cloud server 106. At step 506, the gateway 102 may continue to read sensor feeds, and identify/discover/set the correct dimming protocol/level. According to an aspect, the Ready message 520 includes identifying the luminaire 112, and identifying the dimming protocol and sensor information as collected during the dimming protocol test/discovery 506 by the gateway 102. The cloud server 106 may respond with the dimming and sensor information (Sensor setup info) 522 associated with the setup of the sensors for both baseline and for tune-up of the luminaire 112. According to an aspect, the gateway 102 sets the luminaire 112 to pre-defined states 510 and collects the readings of the sensors. The pre-defined states may include the power levels, voltages, and ampere levels provided by the manufacturer of the luminaire 112 and/or the luminaire drivers 110. The information collected from the sensors may be sent to the cloud server 106 as part of a 'Sensor Readings' message 526. According to an aspect, the cloud server 106 then sends back 512 final tune-up information and a Future Reading Schedule 528 for dimming and taking measurements, which may need to be done on a regular basis/at regular time intervals. The cloud server 106 may update the Luminaire, Driver, and Battery DB 416 and continue to System Operations 402. According to an aspect, the gateway 102 records the scheduling information in the Dimming & Testing Schedule Database 524 and continues to a Standard Operational Mode 530. Changes in the dimming schedule of any luminaire 112 and/or the luminaire dimming control 110 may impact the luminaire's 112/the luminaire driver's 110 end-of-life/life expectancy. Additionally, the system 100, 100' can use the dimming levels to control ON/OFF stages and gradual timing of ON/OFF stages of the luminaire 112; therefore, over time and based on usage of the luminaire 112, the end-of-life/life expectancy predictions may change and become more accurate to the specific point-in-time of the measurements.

Figure 12:
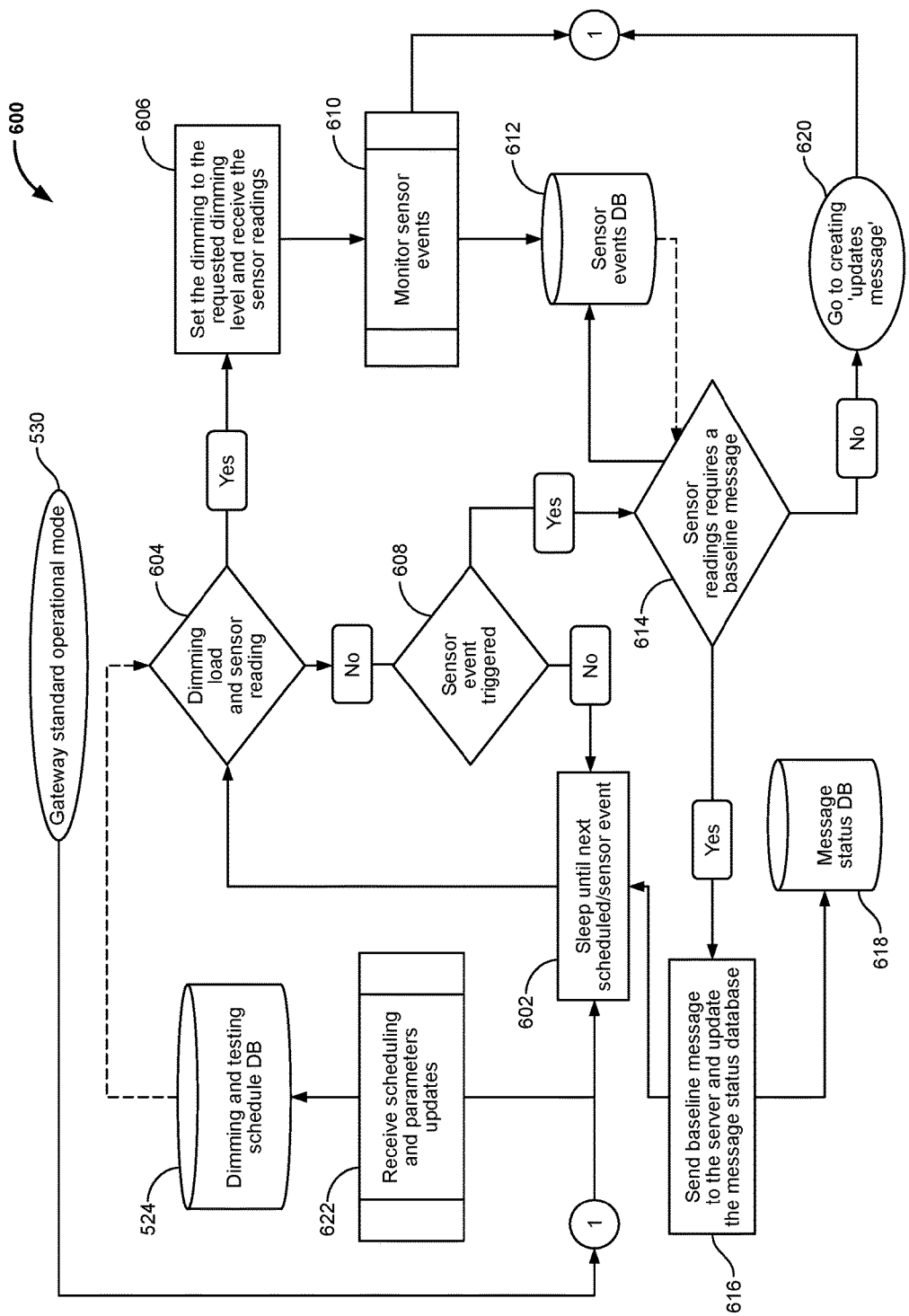
FIG. 12 is a diagram of a system handling a gateway Standard Operational Mode, according to an aspect.

FIG. 12 illustrates an embodiment 600 of the gateway standard operation mode 530. According to an aspect, at step 602, the gateway is primarily in a sleep mode during which it waits for one or more events to occur. In an embodiment, each event may include setting a new dimming level and waiting for a single sensor event or multiple sensor events. According to an aspect, the types of the events the gateway may wait to occur include two types. The first type of event may be associated with existing dimming and testing, including, for example, at a specific/designated time, setting a specific dimming level, and waiting for a set of sensor readings. For instance, at step 622, a "Receive scheduling and parameters updates" process 622 may update the Dimming and testing schedule DB 524 and may also refresh a sleeping timer (not shown) for the gateway to wake at the next appropriate test schedule. According to an aspect, the second type of event includes current/present sensor readings that need to be read and processed.

When the gateway is out of sleep mode/initialized, the gateway may receive a scheduling message from the cloud servers as seen at step 622. The scheduling message may include parameters to populate the Dimming and testing schedule DB 524. At step 604, the gateway may check for any scheduled tests, which may be waiting in the Dimming and testing schedule DB 524. For instance, when the scheduled test is triggered at step 604, the gateway may set the dimming level to a requested lumen/light percentage. According to an aspect, the gateway does not process or handle events that are not planned for and/or scheduled by the Dimming and testing schedule DB 524. If at step 604 there is no scheduled testing event waiting, e.g., 'No', then the operation moves to step 608, where the gateway checks for any triggered sensor events as described in greater detail below. If at step 604, the scheduled test is triggered, 'Yes', the gateway standard operational mode 530 proceeds/moves to step 606 where the gateway sets the dimming protocol to a requested dimming level and reads the sensor status. In an embodiment, after step 606, the gateway performs step 610 where the gateway starts to monitor sensor and/or driver events—e.g., has the sensor(s) or driver/dimming control device changed?

Scheduled dimming level and sensor measurements are conducted at step 606, and include a plurality of sensor readings that must be monitored at step 610. The sensor measurement event requests can be, for example, wait for the temperature readings to reach a specific level/range, wait for the power (e.g., amperage (AMP)) reading to reach a specific range, read light/color intensity for a plurality of colors multiple times, and the like. Such event data is recorded in the Sensor events DB at 612. In an embodiment, when a sensor event occurs, there can be multiple outcomes. For instance, if the sensor reading is the last sensor reading required for this specific scheduled dimming measurement, the gateway may make a decision if the set of measurements requires a new Baseline message at step 614, and if "No", moves to creating an Updates message at step 620. In the case of a baseline message, the gateway may format a new baseline message at step 616 and send it to the server, (not shown), update the schedule to wait for the next dimming schedule and go to sleep at step 602.

The updates message is described in further detail herein below, and in accordance with FIG. 13. In an embodiment, after the updates message is handled, the gateway goes back to sleep (see, for instance, FIG. 10). The third case may occur when there are more events associated with/chained to the current scheduled dimming that the gateway must wait for. In this case, the gateway may go to sleep/enter a sleep mode while waiting for those events. According to an aspect, before the gateway goes to sleep to wait for the other events, the current event is recorded in the Sensor events DB 612, where all accumulated and scheduled events are recorded for future processing. At step 608, the gateway may check for any triggered sensor events. If the response is 'Yes', than the operation moves to step 614. If the response is 'No', then the operation may go back to the step 602 and wait for an event to occur. According to an aspect, at step 614, the gateway may decide if the sensor reading requires baseline messages. If the response is 'Yes,' then the operation moves to step 616. If the response is 'No', then the operation moves to step 620. In an embodiment, the decision to move to one of the step 616 and the step 620 is based on multiple factors, which may primarily include differences between the previous baseline message and the current changes in the baseline messages. According to an aspect, the operation may also move to one of the step 616 and the step 620 if there is no prior baseline message. In an embodiment, at step 616, the gateway sends baseline messages and then moves to step 618, where the Message status database 618 is updated. When there is a need for an updates message, the gateway may go to step 620. When message generation/creation of updates message is complete/done, the gateway may move to the step 602 and wait for the next event to occur. In an embodiment, each event may include setting a new dimming level and waiting for a single sensor event or multiple sensor events. For every event that occurs, the operation may move to step 612 where the gateway updates the Sensor events DB. According to an aspect, monitoring sensor events occurs in parallel/in the background by step 610, while the gateway proceeds to step 602 where the gateway waits for an event to occur.

Figure 13:
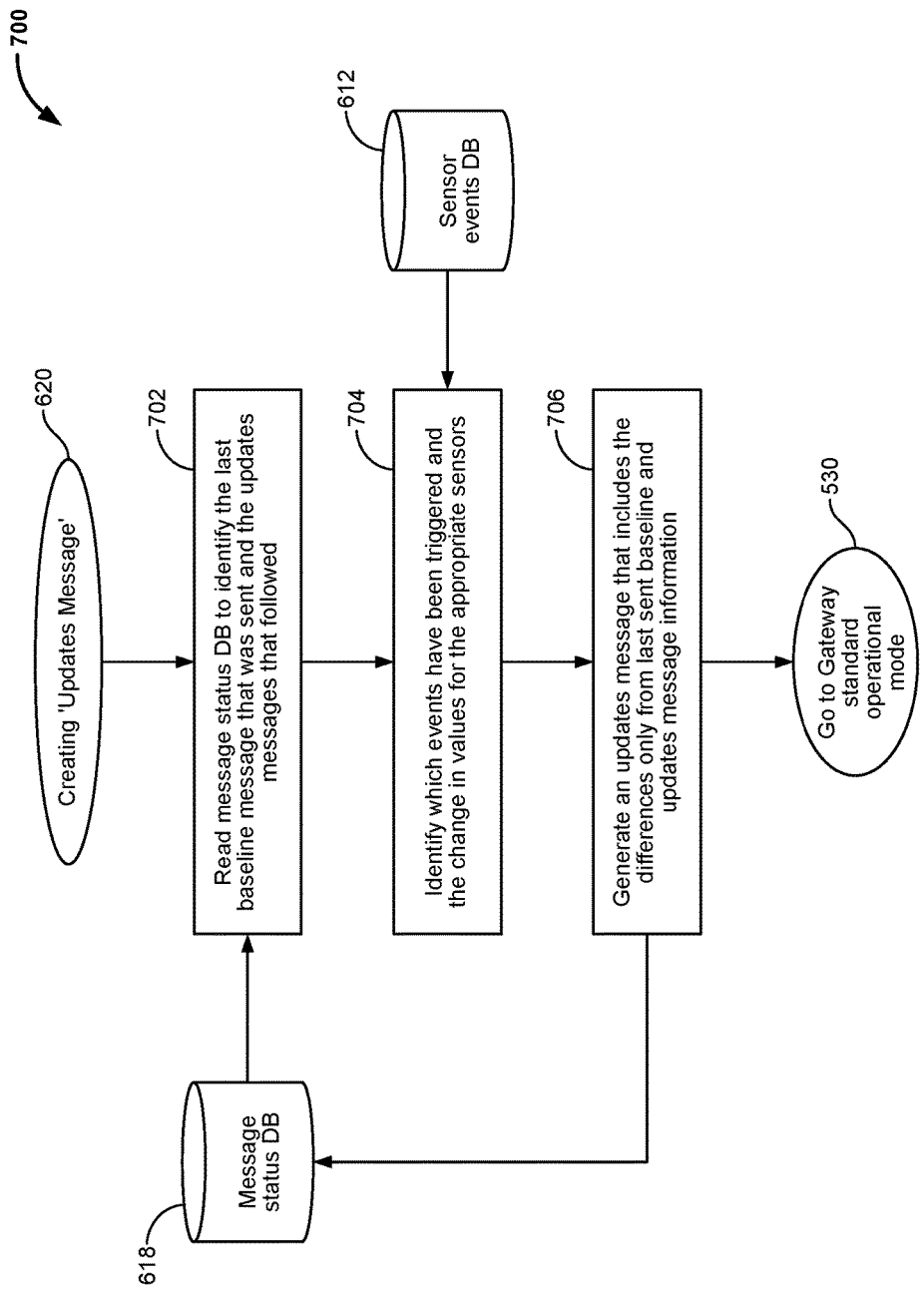
FIG. 13 is a diagram of a system creating an 'Updates Message', according to an aspect.

FIG. 13 illustrates an embodiment 700 of creating the 'Updates Message' 620 described with respect to FIG. 12. According to an aspect, creating the Updates Message 620 may depend on the accumulation of all prior messages sent and recorded in the Message Status DB 618. Based on past/previous messages and current event information stored in the Sensor events DB 612, the gateway may identify sensor readings that have changed and may format a message to include those readings only, and send this message to the cloud server. According to an aspect and with reference again to FIG. 12, once this message is sent, the Message Status DB 618 may be updated for future analysis, and the gateway may go back to sleep and wait for the occurrence of any next events as part of the standard operational mode 530.

According to an aspect, and as illustrated in FIG. 13, at step 702, after receiving messages from the message status DB 618, the gateway may identify the last baseline message sent and the updates message(s) that followed. At step 704, the gateway may identify which of the events has been triggered and what changes have taken place in the values for the appropriate sensors, after receiving information from the sensor events DB 612. According to an aspect, at step 706, the gateway generates an updates message, which may include only the differences between the previously sent/last sent baseline message and the accumulated updates message information, and the current sensor readings from sensor events DB 612. The process of creating updates message 620 may proceed to step 530, in which the gateway moves into the standard operational mode 530 (see, for instance, FIG. 12) According to an aspect, at step 706, the gateway may simultaneously update the message status DB 618.

Figure 14:
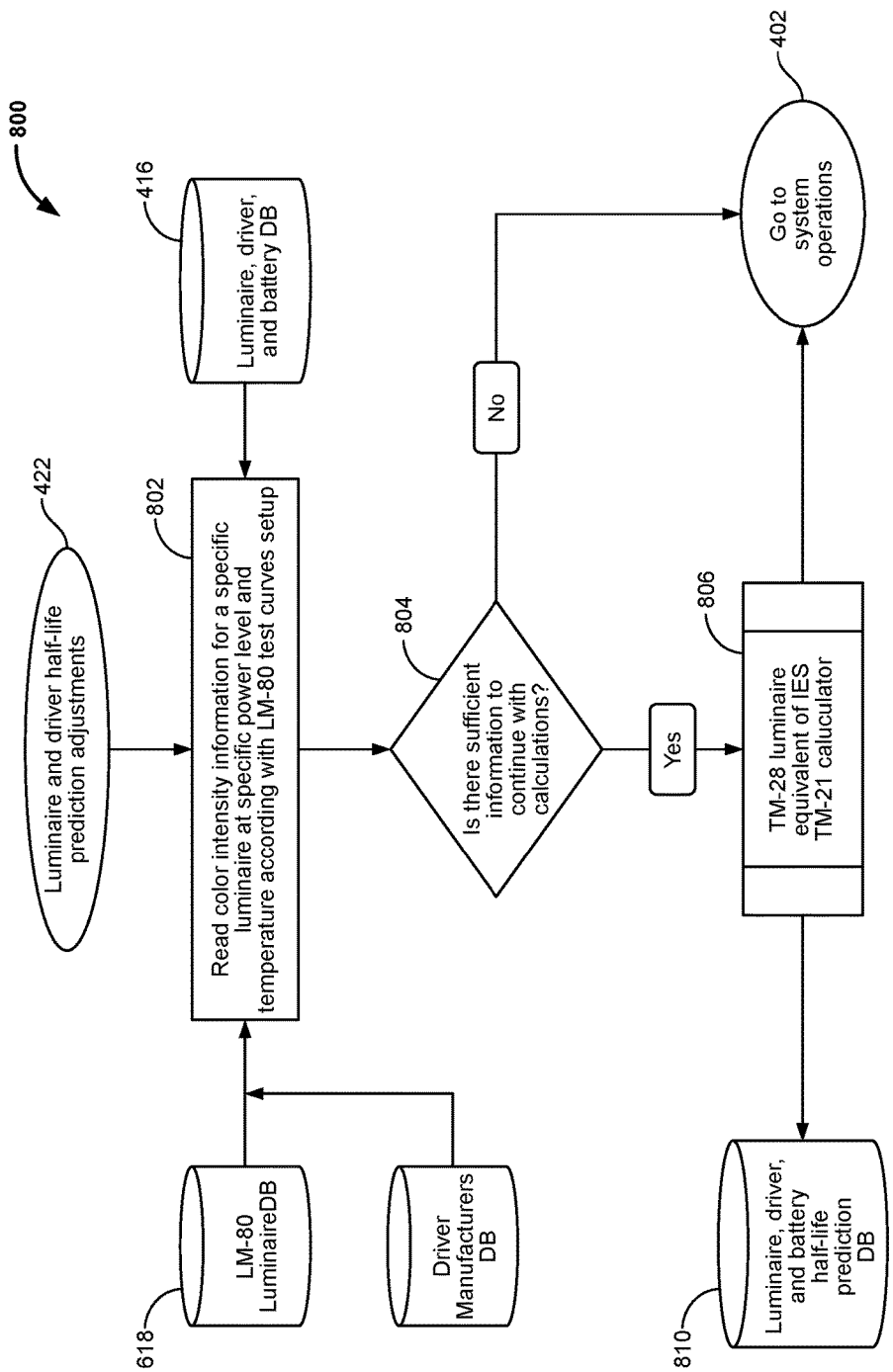
FIG. 14 is a diagram of a system illustrating cloud servers calculating specific luminaire, driver, and battery end-of-life prediction information, according to an aspect.

FIG. 14 illustrates an embodiment 800 of the cloud server 106 calculating specific luminaire end-of-life prediction information. According to an aspect, color sensors are used to demonstrate readings/measurements that are linearly correlated to a luminaire light intensity depreciation graph, which may help to calculate light intensity depreciation/end-of-life prediction. In an embodiment, the color sensors are consistent in their readings across a plurality of sensors, such that when a luminaire/LED light intensity reading changes by X %, the sensor color intensity reading changes by the same X %. In other words, the luminaire light intensity may directly correlate to the sensor color intensity. According to an aspect, the total sensor intensity readings are not equivalent to the actual lumen emission by the luminaire 112 to which the sensors are attached.

When exponential graphs are linearly correlated, a change in one (the curve) can fit the curve (change) in the other directly. Illuminating Engineering Society of North America (IESNA) Standard LM-80 ("Approved Method for Measuring Lumen Maintenance of LED Light Sources") includes manufacturing data for a plurality of LED light sources, which, when paired with a luminaire's chip running temperature, can provide theoretical predictive life calculations. By testing the luminaire to IESNA LM-79 ("Approved method for the Electrical and Photometric Measurements of Solid-State Lighting Products") standards and utilizing any IESNA Standard LM-82 ("Characterization of LED Light Engines and LED Lamps for Electrical and Photometric Properties as a Function of Temperature") data that may be available, a Luminaire, driver, and battery DB 416 may be generated. The Luminaire, driver, and battery DB 416 includes information that is specific to the fitting and dimming, as well as to the sensor reading ranges, etc., associated with the specific luminaire. The Luminaire, driver, and battery DB 416 also includes information such as past sensor readings, associated times of reading, dimming level, temperatures, current readings, etc. Sensor readings such as light/color intensity and temperature, among others, can be normalized based on the original (initial) readings received upon installation and/or commissioning of the luminaire in the lighting system as in FIG. 11.

In one exemplary embodiment, an Energy Star® TM-28 calculator, which is the equivalent of an Illuminating Engineering Society (IES) TM-21 ("Lumen degradation lifetime estimation method for LED light sources") calculator 806, is taking data that was collected over time in the Luminaire, driver, and battery DB 416 for test samples and is plotting this information after normalization into TM-28. This step allows for prediction of luminaire maintenance over time. The standard information within LM-80 given by the manufacturer may be insufficient and is dependent on a fixed temperature and the current state of the luminaire for the readings. In one embodiment, the disclosed system is using the sensor readings at specific temperatures and dimming levels to extrapolate the place of the luminaire color intensity readings on the LM-80 given curves of this specific luminaire. Using this information, and knowing the time period elapsed between readings, and after correlating this information with previous readings, the system can extrapolate a new curve that more accurately represents the current luminaire's behavior. As such, the relationship or correlation between color temperature and dimming level can be determined, and this relationship can be updated over time as the color temperature (lumen level) of the luminaire degrades over time. This new curve is based on the luminaire's true environment and usage (e.g., dimming schedule, power and temperature levels, degradation of the lens and the physical fittings, etc.) over time. This information is stored in the Luminaire, driver, and battery half-life prediction DB 810 for future use, and the next step is to wait for the next event as part of the System Operations.

In an embodiment, the multiple sensor readings associated with color intensity are normalized using an equation that divides the current reading by the initial reading taken when the luminaire was first installed and/or commissioned in the lighting system, as in FIG. 11. According to an aspect, the luminaire, dimming control, and rechargeable battery half-life adjustments/end of life predictions begin at step 802, where the cloud servers 106 read the color intensity information for a specific luminaire at a specific power level and temperature. In an embodiment, step 802 occurs after the cloud servers 106 have received information from the LM-80 Luminaire DB 812 and the Luminaire, driver, and batter DB 416. The Luminaire, driver, and battery DB 416 may include information specific to the fitting and dimming, as well as to the sensor reading expected ranges, associated with the specific luminaire. According to an aspect, the Luminaire, driver, and battery DB 416 may also include all past sensor readings, with the associated times/time stamps of when the reading, dimming levels, temperatures and current readings took place (see, for instance, FIGS. 10-13). In an exemplary embodiment, the sensor, temperature, and current readings can be normalized based on the original readings received upon installation of the luminaire 112, as shown in the setup and discovery operations in FIG. 11. In another aspect or exemplary embodiment, the current readings, such as ambient light levels, light intensity of the emergency light fixture, dimming levels, power consumption of the emergency power source, etc., may be compared with corresponding previous readings (for example, from previous emergency lighting tests) to refine degradation, half-life, and/or end of life predictions and/or curves for the emergency power source and/or lighting fixture components. For example, the light intensity of an emergency luminaire at different times during an entire total discharge test of its emergency power source may be compared to corresponding data from a previous test to determine a degree of degradation of the emergency power source and/or lighting fixture, and the results of the comparison extrapolated to determine a half-life or end of life of the system or particular components.

At step 802, the cloud servers 106 may read the all the information received from Driver Manufacturers DB 820 and the Luminaire, driver, and battery DB 416 for the specific luminaire. The information may include the specific power levels and temperatures, as well as the sequence of temperature changes of the electronic luminaire and/or dimming control driver. According to an aspect, the Luminaire, driver, and battery DB 416 includes information that is specific to the luminaire, the driver, and the dimming level, as well information that is specific to the expected ranges of the sensor readings of the specific luminaire. As described in further detail herein above, the Luminaire, driver, and battery DB 416 may also include all past readings with associated timestamps, and may normalize the readings based on the original readings received upon installation of the luminaire. At step 804, the cloud servers 106 may decide if the collected and/or accumulated information/readings are sufficient to continue with calculations. If the response is 'No', then the operation moves to step 402, which is the system operations main loop where the cloud server will wait for sufficient readings to be collected. If the response is 'Yes', then the operation moves to step 806.

At step 806, the TM-28 luminaire equivalent of the IES TM-21 calculator takes data that was collected over time in the Luminaire, driver, and battery DB 416 to create a test sample. The data for the test sample may be plotted in a graphical format, after normalization the data into the TM-28 luminaire. According to an aspect, this step allows for the prediction of lumen maintenance over time, which helps to predict potential failure of the luminaire 112. At step 806, the information collected about the luminaire and/or driver, the temperature, and the ON/OFF events (based on current readings/information, as accumulated and reported) are analyzed/evaluated, and a new end-of-life graph prediction is calculated. At step 810, the information generated in step 806 is stored in the Luminaire, driver, and battery half-life prediction DB 810 for future use; thus, the exemplary systems may retain the information and use the information to create further end-of-life predictions based on failure variable indications of the emergency lighting fixtures.

Figure 15:
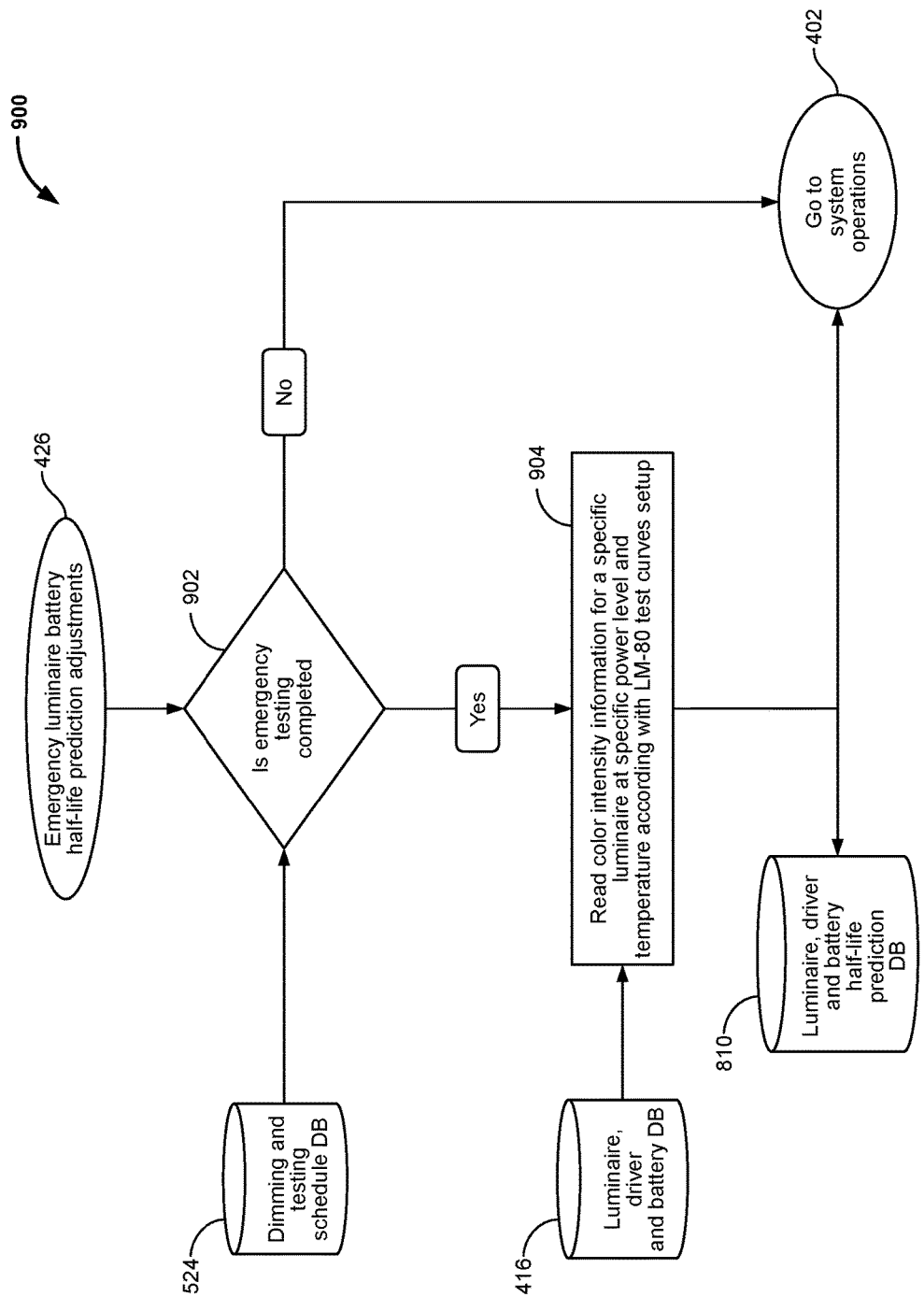
FIG. 15 is a diagram of a system illustrating cloud servers calculating specific battery end-of-life prediction information, according to an aspect.

FIG. 15 illustrates an embodiment 900 of the cloud servers calculating specific battery end-of-life prediction information. According to an aspect, the battery half-life adjustments/end of life predictions begins where the cloud servers read the dimming and testing schedule 524 information for a specific battery of a luminaire at a specific power level and temperature. In an embodiment, after the cloud servers have received information from the Dimming and testing schedule DB 524 to conduct the test, at step 902 the cloud servers may decide if the collected and/or accumulated information/readings are sufficient to continue with calculations. If the response is 'No', then the operation moves to step 402, which is the system operations main loop where the cloud servers will wait for sufficient readings to be collected. If the response is 'Yes', then the operation moves to step 904. At step 904, the data regarding, for example, light/color intensity, color temperature, and/or dimming level during operation of the emergency power source is received from the Luminaire, driver, and battery DB 416 and compared with past test measurement results to generate a predictive graph on how fast the battery drains. The system communicates with at least one dimming protocol module to enact the test procedures to predict the battery failure. The system with or without the dimming control protocol is configured to predict when the battery charge will fail and also verify there is light via the up looking sensor. The Luminaire, driver, and battery DB 416 may include information specific to the luminaire and dimming level, as well as to the sensor reading expected ranges associated with the specific luminaire. According to an aspect, the Luminaire, driver, and battery DB 416 may also include all past sensor readings, with the associated times/time stamps of when the reading, dimming levels, temperatures and current readings took place (see, for instance, FIGS. 10-13). In an embodiment, the sensor, temperature, and current readings can be normalized based on the original readings received upon installation of the luminaire, as described with respect to, for instance, FIG. 11. The Luminaire, driver, and battery DB 416 may include information such as charging and discharging time of the rechargeable batteries, which is used to determine in part the maximum time period that the rechargeable batteries could last. The information generated in step 904 is stored in the Luminaire, driver and battery half-life prediction DB 810 for future use. The information may include, for example and without limitation, luminaire, battery, and LED end-of-life predictions. Thus, the system may retain the information and use the information to create and refine end-of-life predictions based on failure variable indications of the emergency lighting fixtures, such as the luminaire, the battery, and the LED. In some cases, the driver or luminaire may have an expected end-of-life before the battery, and sometimes the other way around. In some cases, luminaires including a battery must be changed as a single unit.

Figure 21:
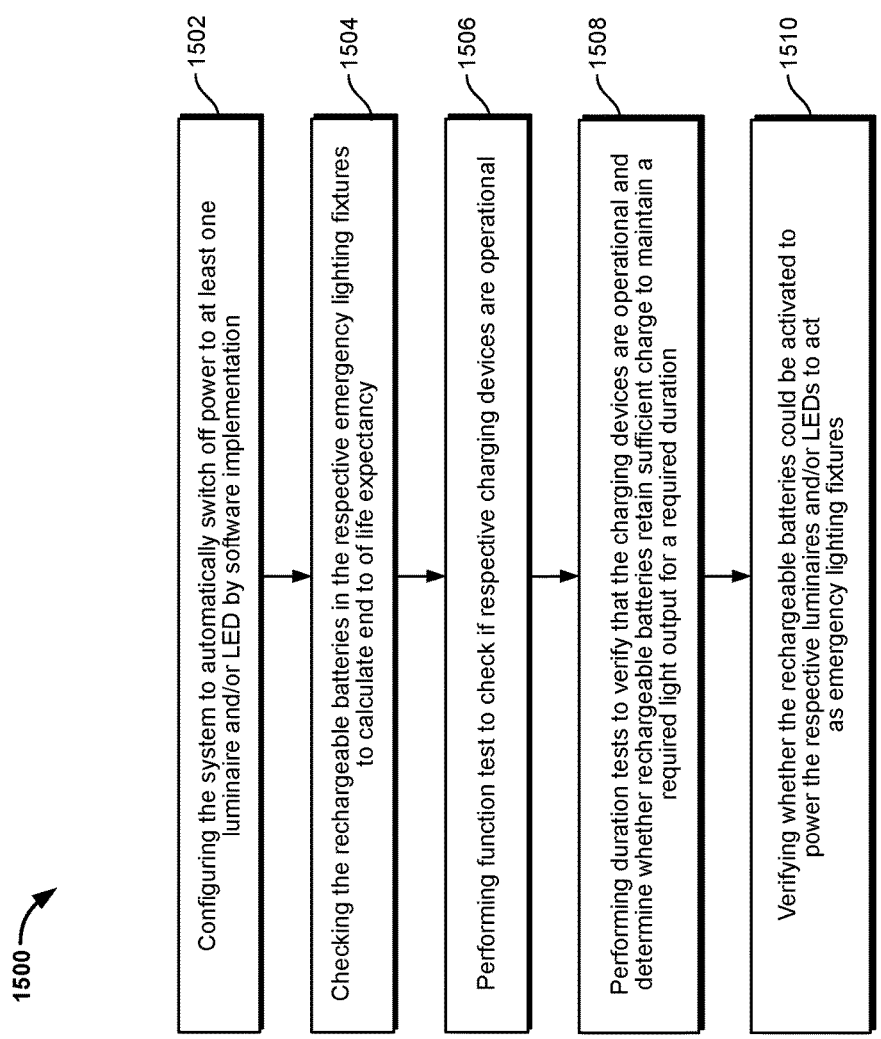
FIG. 21 is a method of predicting life expectancy of a rechargeable battery according to an aspect.

FIG. 21 is directed to an exemplary method 1500 of predicting end of life expectancy of a rechargeable battery which is inbuilt (i.e, within) or connected to a luminaire and/or LED and acts as an emergency power source for the luminaire/LED. At step 1502, the system is configured to automatically switch off power to at least one luminaire and/or LED by software implementation. At step 1504, the rechargeable batteries in the respective emergency lighting fixtures are checked to calculate end of life expectancy. At step 1506, a function test is performed to check if respective charging devices are operational. Said function test is not necessarily intended to validate the performance of the battery (other than complete failure) as the duration of this test is typically only 1-2 minutes. This test may be periodically performed, e.g., on a monthly basis or otherwise in accordance with regulations. At step 1508, a duration test is performed to verify that the charging device is operational and determine whether the rechargeable batteries retain sufficient charge to maintain a required light output for a required duration. The duration may be, for example, three (3) hours in the case of some UK regulations. This test may be periodically performed, e.g., on an annual basis or otherwise in accordance with regulations. At step 1510, the system verifies whether the rechargeable batteries could be activated to power the respective luminaires and/or LEDs to act as emergency lighting fixtures.

After the emergency lighting test, each rechargeable battery is recharged. The time required for the rechargeable battery to complete its charging cycle is additional information on which a prediction of battery failure may be based. The exemplary method may also predict the required time to perform an emergency lighting test, and an optimal time to perform the test, based on historical information regarding the battery charge cycle and the environment in which the test is performed. For example, the environment sensor may provide information regarding time(s) when footfall in the test area is at a relative minimum and the test would be least intrusive, based on the number of people that may have to vacate the test area. Historical information regarding a battery's charge cycle may be at least one basis for predicting the life of the rechargeable battery and the required time for one or more rechargeable batteries to obtain a sufficient charge to power the emergency lighting fixtures at a level that provides a requisite amount of light to the test area. In the event that an emergency test is being conducted and footfall is detected in the testing environment without requisite light intensity, the exemplary embodiments are capable of stopping the test and restoring a main power supply to the lighting fixture as a safety measure.

Figure 22:
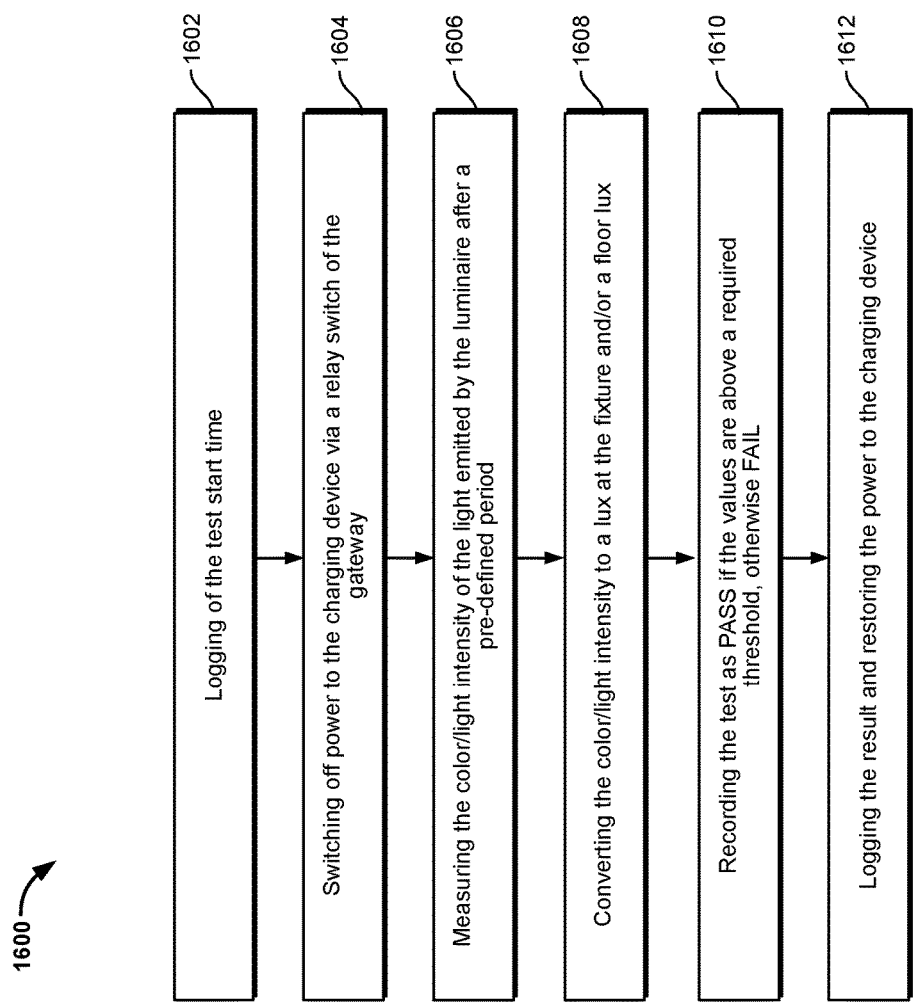
FIG. 22 is a method of performing a function test according to an aspect.

FIG. 22 shows an exemplary method 1600 of performing a function test with respect to the exemplary system embodiments. The method includes, at step 1602, logging of the test start time. At step 1604, power to the charging device is switched off via a relay switch of the gateway. At step 1606, the color/light intensity of the light emitted by the luminaire, and/or the ambient light intensity (as measured by an Ambient Light Sensor (ALS)), is measured after a pre-defined period, for example and without limitation, one (1) minute. The ambient light intensity may provide an adjustment to the color/light intensity emitted by the luminaire, to account for ambient light in the environment. At step 1608, the color/light intensity that is measured in step 1606 is converted to a lux at the fixture and/or a floor lux by way of, e.g., calculation, calibration, and/or a lookup table. At step 1610, the test is recorded as a PASS if the lumens/lux values are above a required threshold, or otherwise the test is recorded as a FAIL. At step 1612, the result is logged and power is restored to the charging device.

Figure 23:
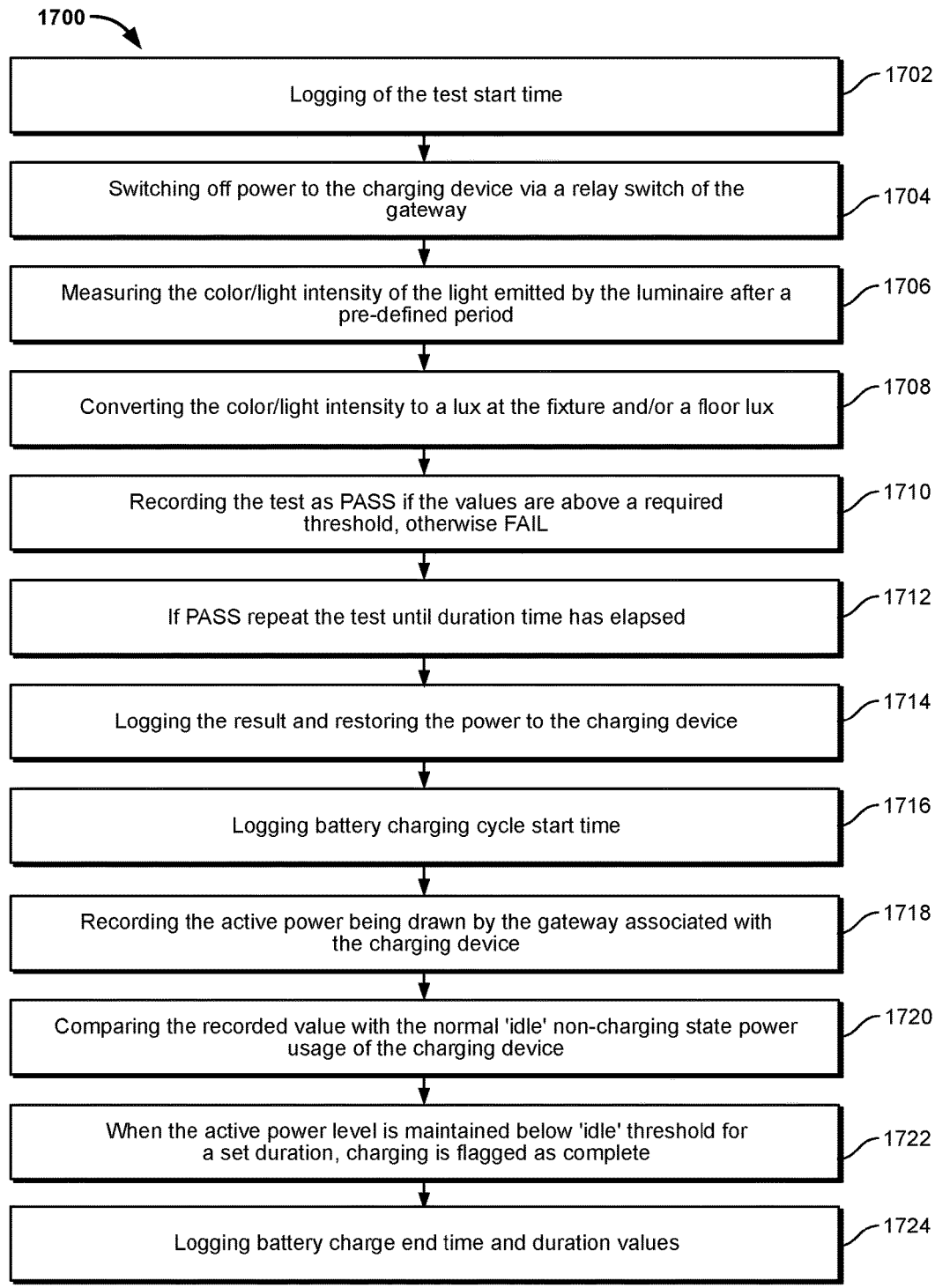
FIG. 23 shows a method of performing a duration test according to an aspect.

FIG. 23 shows an exemplary method 1700 of performing a duration test with respect to the exemplary system embodiments. The method includes, at step 1702, logging of the test start time. At step 1704, switching off power to the charging device via a relay switch of the gateway. At step 1706, measuring the color/light intensity of the light emitted by the luminaire, and/or ambient light intensity, after a pre-defined period, for example and without limitation, one (1) minute. The color/light intensity and/or ambient light intensity may be depicted graphically (1810, FIG. 24), e.g., at a user interface or display such as the exemplary display shown in FIG. 24. At step 1708, converting the color/light intensity that is measured in step 1706 to a lux at the fixture and/or a floor lux by way of, e.g., calculation, calibration, and/or a lookup table. At step 1710, recording the test as a PASS if the lumens/lux values are above a required threshold, or otherwise recording the test as a FAIL. At step 1712, if the test is a PASS, the test is repeated until a duration (i.e., a selected or required amount of time or emergency power source discharge) has elapsed. At step 1714, logging the result and restoring power to the charging device. At step 1716, the start time of the rechargeable battery charging cycle start time is logged. At step 1718, the active power being drawn by the gateway associated with the charging device is recorded, either continuously or periodically. At step 1720, the recorded active power value is compared with the normal 'idle' non-charging state power usage of the charging device as recorded, e.g., during calibration of the charging device. At step 1722, when the active power value is maintained below the 'idle' usage for a certain amount of time, the charging is flagged as complete. At step 1724, the end time of the rechargeable battery charge cycle, and the corresponding time required to charge the battery to a sufficient level to provide a minimum required light intensity/floor lux from the light fixture, is logged. Any or all of the measurements and/or logged information collected during the method described with respect to FIG. 23 may be plotted graphically, displayed in real time, and/or shown as successive log entries, e.g., as a display such as the display shown in FIG. 24 and described further below with respect to that figure.

The exemplary disclosed methods may also include performing a total discharge test in which the emergency fixture remains on rechargeable battery power until the rechargeable battery is entirely discharged. Light intensity of the emergency fixture is measured either continuously or periodically during the test along with the total time until the battery is completely discharged and/or the emergency fixture reaches a minimum required light intensity. The light intensity and/or time measurements from a total discharge test are compared to corresponding measurements from one or more previous total discharge tests to determine, at least in part, an end of life or half-life prediction for the rechargeable battery. In addition, the length of time and/or amount of power that is required to recharge the battery to a power level that is sufficient to power the emergency lighting device at a requisite or desired intensity are measured during the charging cycle. The amount of time and/or power that is required to recharge the battery to the sufficient power level is used to determine an amount of time required to conduct the total discharge test and/or other emergency lighting fixture tests, before sufficient lighting is restored to the test area to allow people to reenter. Information from the total discharge test measurements may also be compared across different types of rechargeable batteries, charging devices, luminaires, LEDs, etc., to determine which types of devices perform the best and identify factors that may affect performance, for example, the environment of a particular device.

In an aspect, exemplary disclosed methods include performing a total discharge test when a relative minimum number of people, or no one, is expected in the test area of the emergency fixtures for the entire time required to conduct the test. The number of people typically in the test area at any given day/date/time may be determined, e.g., by monitoring motion and/or footfall with the downward facing environment sensor described herein, and using the historical data to determine when footfall is at a relative minimum or zero (0). The exemplary methods may further include scheduling a total discharge test based at least in part on the predicted amount of time required to conduct the total discharge test (as discussed above) and a day/date/time when footfall is at a relative minimum or zero (0) for an amount of time equal to or greater than the time required to conduct the total discharge test. The environment sensor may also be configured to determine whether any people are currently in the test area, in real time, and abort the test if any people are detected in the test area.

Figure 24:
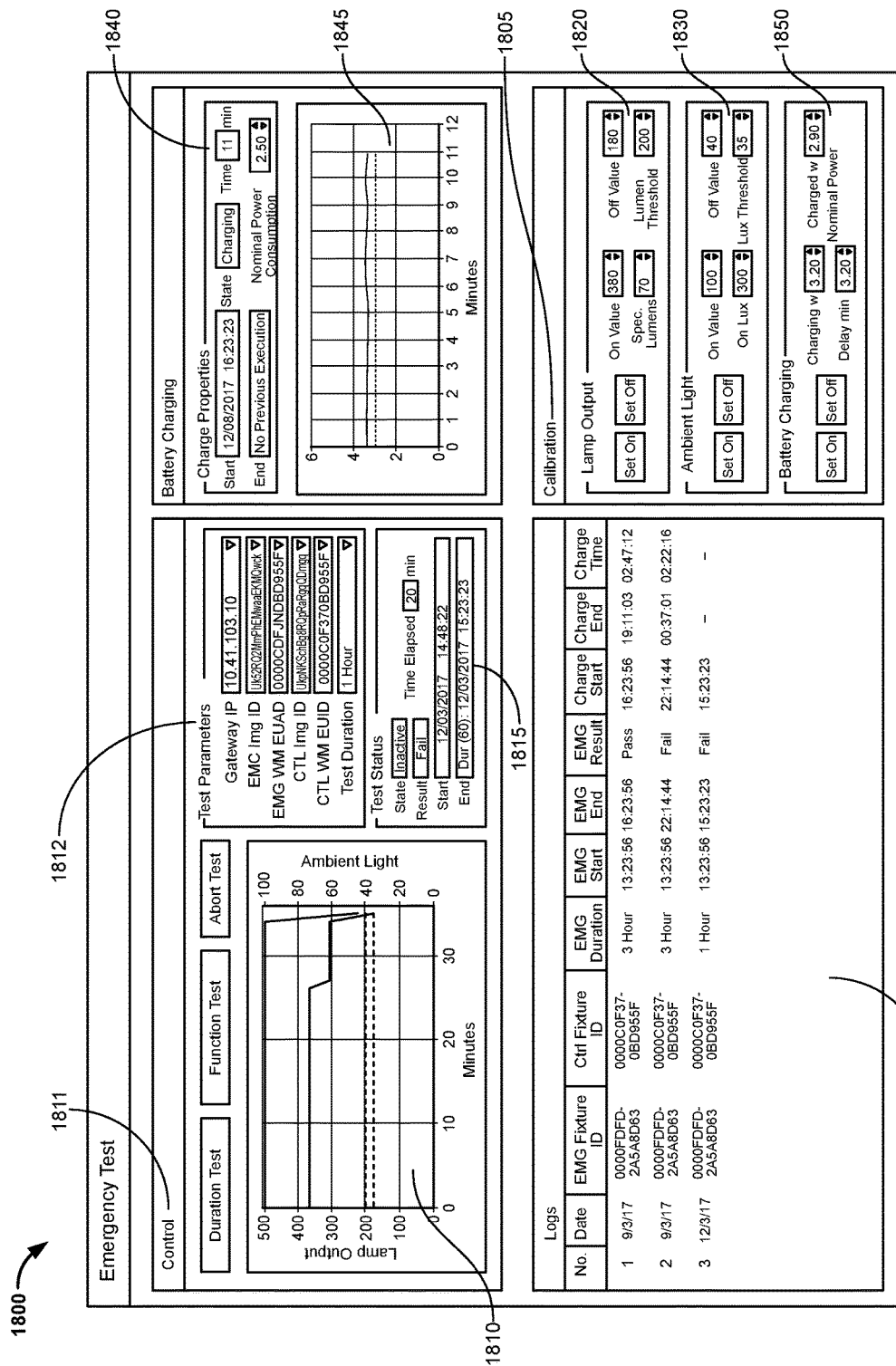
FIG. 24 is a screenshot of an exemplary test program, which has been developed to execute an emergency test on a single luminaire incorporating 2 gateways according to an aspect.

According to an aspect, FIG. 24 is a screenshot 1800 of an exemplary display and test program for conducting an emergency test on a luminaire incorporating an LED light source. The exemplary display/program includes, among other things, a control pane 1811 that may be used to select a function or duration test, or abort a running test, and displays the test parameters 1812 such as, among other things, an Internet Protocol (IP) address of the gateway associated with the test and the duration of the test. The test status 1815 including the state of the test, the result of the test, time elapsed during the test, and the start date/time and end date/time of the test may also be displayed. In the exemplary embodiment shown in FIG. 24, control pane 1811 further includes a graph 1810 that the program compiles to plot the color/light intensity of the emergency light/luminaire being tested and the ambient light in the environment in which the luminaire is installed, as a function of time. Logs 1860 record and display the parameters and results of previous tests.

The exemplary display/program 1800 further collects and displays information regarding the charge properties 1840 of the rechargeable battery associated with the emergency fixture being tested. The information includes, among other things, the start and end time of the battery charge cycle and the current state of the charging process. The program further compiles and displays a graph 1845 which plots the active power (solid line) as a function of time during charging, and the nominal, or idle, power consumption (dotted line). Calibration pane 1805 displays calibration values and controls for the luminaire associated with the test 1820, the ambient light in the environment in which the luminaire is installed 1830, and the battery charging properties 1850 for the rechargeable battery associated with the emergency fixture being tested. The calibration values are used, for example, to correlate/calculate lux levels for the luminaire, predict life expectancy for the luminaire and/or battery, and determine battery charge time and the amount of time required to conduct the test.

Figure 16:
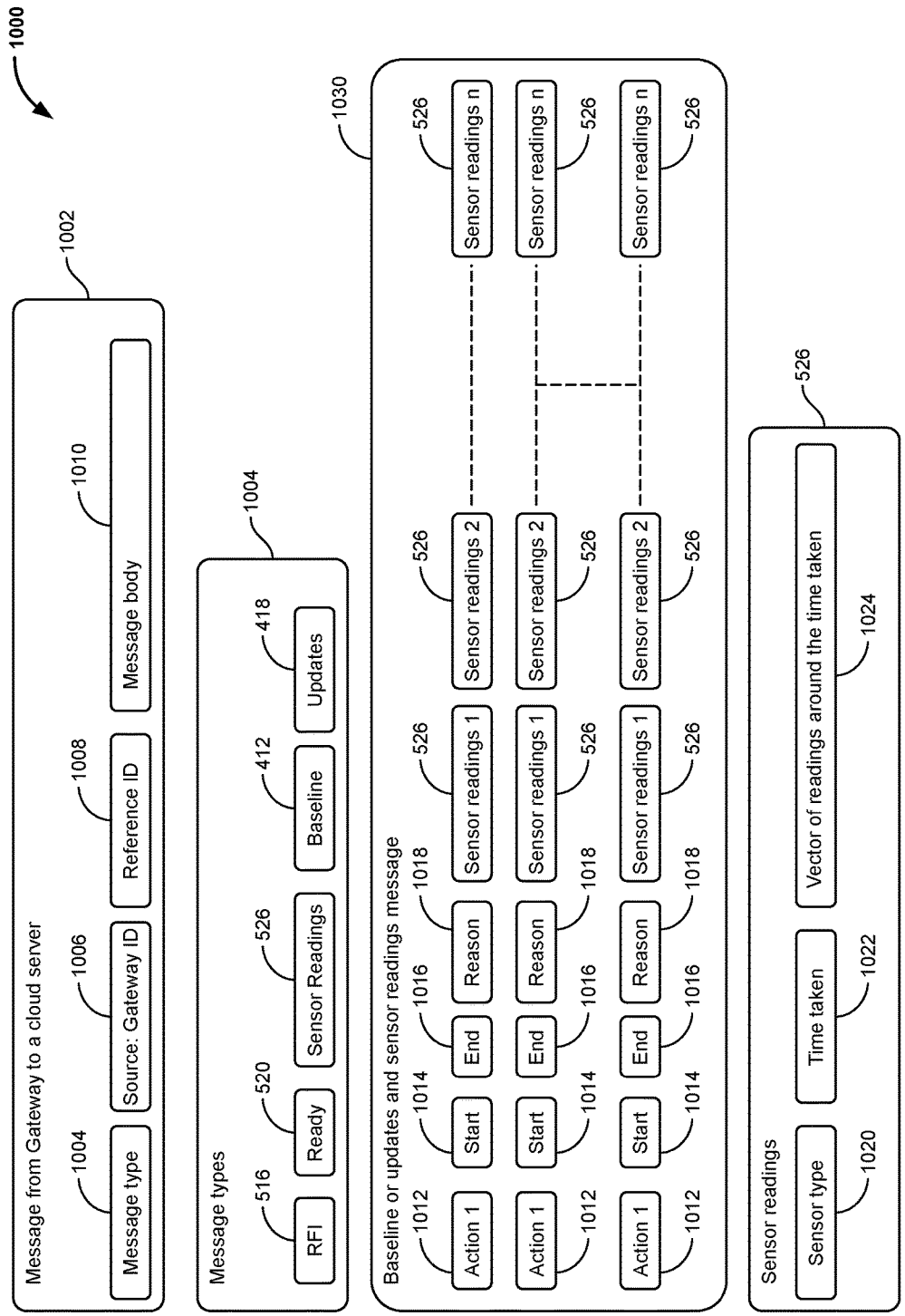
FIG. 16 is a diagram of a message structure for messages delivered from a gateway to cloud servers, according to an aspect.

FIG. 16 illustrates an embodiment 1000 of a message structure for messages delivered from the gateway 102 to the cloud servers 106 (FIGS. 3, 4). In an embodiment, the message 1002 from the gateway 102 to the cloud servers 106 is a single structure message. The single structure message may include a Message type 1004, a sender gateway unique identification ("Source: gateway ID") 1006, a unique Reference ID 1008, and a Message body 1010. The Message type 1004 may inform the receiver about the type of the message being delivered. As used herein, the reference ID 1008 is an internal number that may be used when there is a conversation/message communication between the cloud servers 106 and the gateway 102. In an embodiment, the message body 1010 can be a baseline message or an updates message and it is structured the same in both cases. In an embodiment, the Message type 1004 includes a 'Request for Information' (RFI) 516, which is sent upon initialization of the luminaire, and a 'Ready' message 520 that is sent during initializations of the luminaire 112, after discovering the dimming protocol and when the gateway 102 is ready for further instructions. The Message type 1004 may include a Sensor readings message 526, which is sent to the cloud servers 106 during the initialization period. Additional Message types 1004 include the 'Baseline' message 412 and the 'Updates' message 418 message, which are used when sending baseline and updates messages, respectively, which are based on prior scheduled sensor readings by the gateway 102.

In an embodiment, the Baseline message 412 or the Updates message 418, and the Sensor Readings message 526, is a 'Message body' 1030. The message structure of the Message body 1030 may be the same as the structures of the baseline 412 or updates 418 messages, and the sensor readings 526. For every 'action' 1012 included in the Message body 1030, such as, for example, setting a dimming level, there is a 'Start' 1014 (an actual start time) and, an 'End' 1016 (an actual termination/end time), and a 'Reason' 1018 (why the action was terminated), and sensor readings 526 for all sensors participating in the action 1012. According to an aspect, the sensor readings 526 may have been previously-scheduled by the cloud server 106. The 'Reason' 1018 can be success or failure of the sensors, for multiple reasons.

The Sensor reading 526 part of the message may include a 'Sensor type' 1020 field to indicate which sensor reading is being communicated (such as, for example, TEMP, ALS, and RGB), a 'Time taken' 1022 field to indicate when the sensor reading was taken, and a 'Vector of readings' 1024, which includes multiple readings centered around the 'Time taken' 1022 field. In an embodiment, the number of readings can be based on the sensor type. According to an aspect, the number of readings taken is three, including shortly before, at, and shortly after the 'Time taken' 1022 field value.

Figure 17:
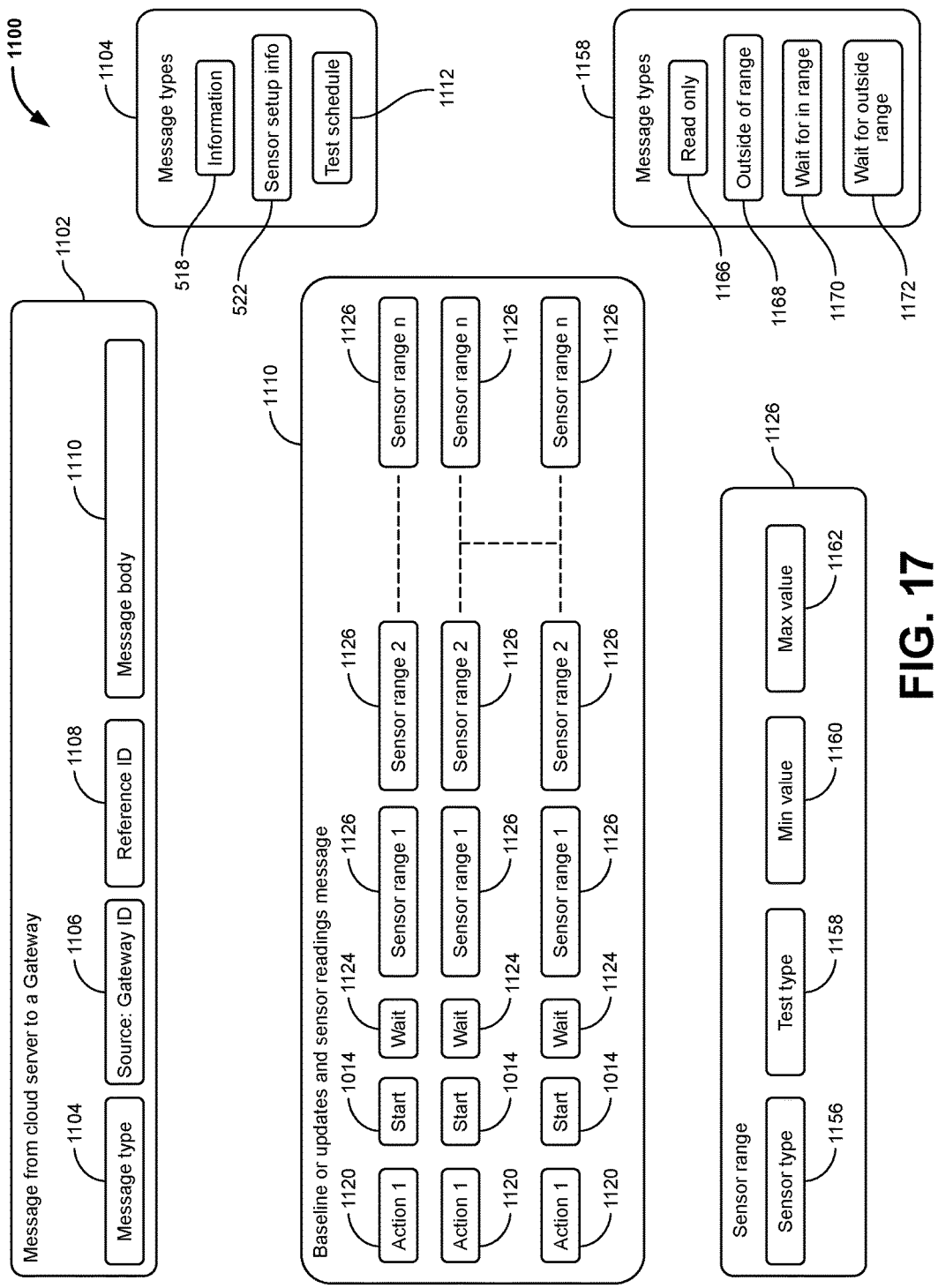
FIG. 17 is a diagram of a message structure for messages delivered from cloud servers to the gateway, according to an aspect.

FIG. 17 depicts an embodiment 1100 of the message structure for messages delivered from the cloud servers 106 to the gateway 102 (FIGS. 3, 4). The messages may be delivered by a UART 224 power meter interface including a transmitter and a receiver (not shown.) In an embodiment, the structure of the message 1102 is constant. The constant message structure may include a Message type 1104, a target gateway unique identification 1106, a unique Reference ID 1108, and a Message body 1110. The Message type 1104 may identify the type of message being transmitted/received and let the receiver know what kind of message it is. The unique reference ID 1108 is an internal number that maybe used when there is a conversation between the cloud servers 106 and the gateway 102. In an embodiment, the Message body 1110 is a Future Reading Schedule 528.

In an embodiment and as illustrated in FIG. 17, the Message type 1104 may include the 'Information' 518, the 'Sensor Setup Info' 522 and a 'Test Schedule' 1112. The 'Information' 518 may include the 'Sensor Setup Info' 522 messages, which provide the gateway 102 with information about valid ranges for sensor readings at different dimming levels. According to an aspect, the Message body 1110 is a Future Reading Schedule 528. The Future Reading Schedule 528 may provide/serve as a baseline for the gateway 102 in its internal measurement and initialization cycle. In an embodiment, the gateway 102 includes a default setup, which may be updated by the Future Reading Schedule 528. The Sensor Reading Schedule 528 may include an 'Action' 1120 field, which may include the dimming level, a 'Start' 1122 field (the start time for the test), and a 'Wait' 1124 field (the duration to wait before any measurement commences), followed by a list of sensors that are configured to participate in the measurements 1126. In an embodiment, 'Sensor range n' is given as a list of sensor ranges per sensor.

In an embodiment, the Sensor range 1126 includes a 'Sensor Type' 1156 field, which identifies the sensor, and a 'Test Type' 1158 field, which informs/instructs the gateway 102 how to run the test. The Sensor range 1126 may further include a 'Min Value' 1160 field and a 'Max Value' 1162 field, each of which may provide the valid range for the sensor in the associated test. In an embodiment, the 'Test Type' 1158 directs/instructs the gateway 102 to handle different sensor values utilizing different methods/ways. These methods may include a 'Read Only' test 1166, an 'Outside of Range' test 1168, a 'Wait For in Range' test 1170, and a 'Wait for Outside Range' test 1172. In an embodiment, when the Test Type 1158 is the 'Read Only' test 1166, the value of the sensor is retrieved regardless of the sensor reading range. When the Test Type 1158 is the 'Outside of Range' test 1168, the value of the sensor is retrieved if it is outside of the sensor reading range to be retrieved. When the Test Type 1158 is the 'Wait for in range' test 1170, the gateway 102 does not continue with other sensor readings/measurements until the specific sensor is in a desired/given range. When the Test Type 1158 is the 'Wait for outside range' test 1172, the gateway 102 does not continue to read sensor values until the sensor value is outside the given range.

Figure 18:
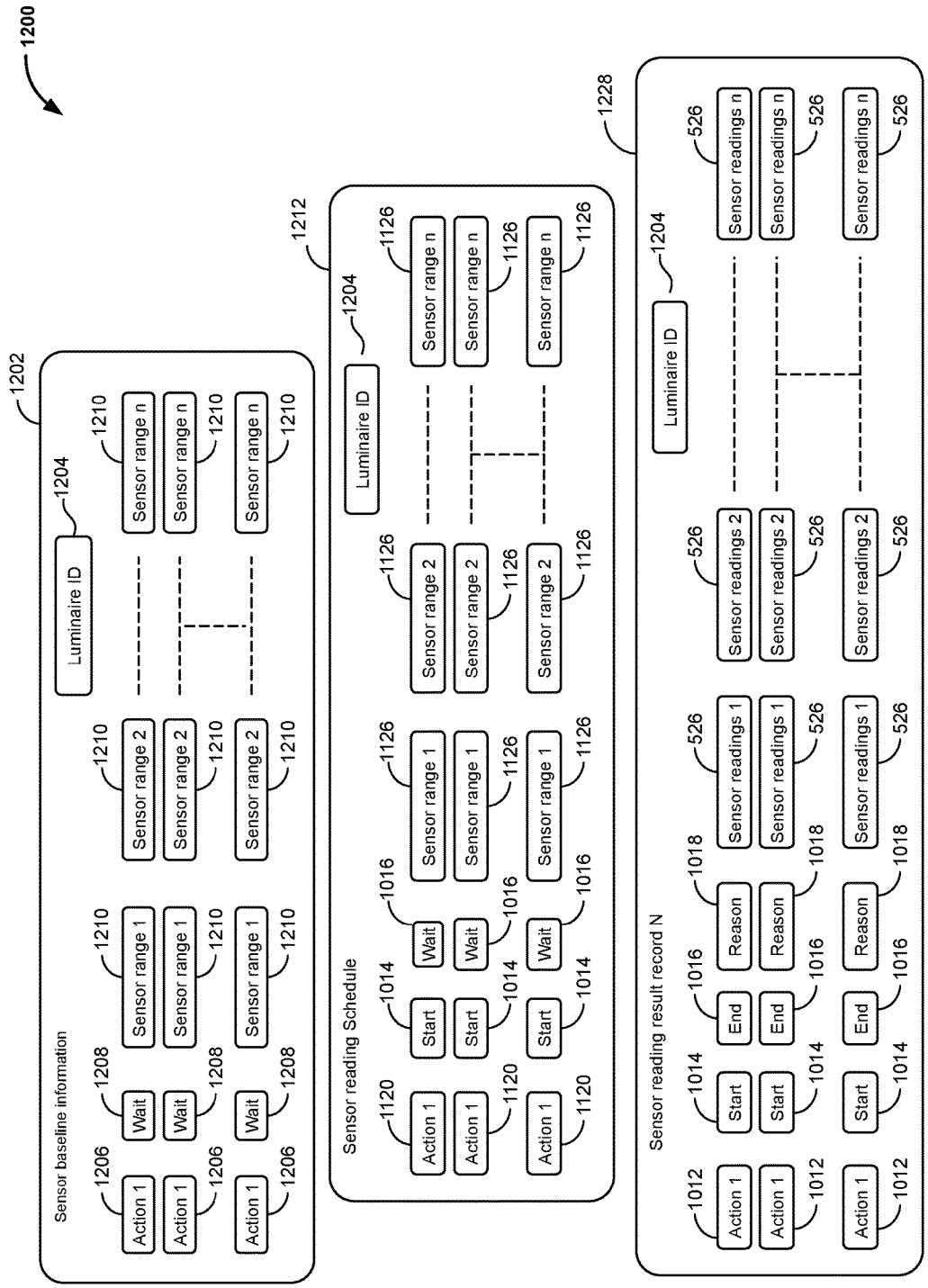
FIG. 18 shows a diagram of a luminaire database structure, according to an aspect.

FIG. 18 illustrates an embodiment 1200 of the Luminaire, driver, and battery DB 416 structure. In an aspect of the exemplary embodiments, the Luminaire, driver, and battery DB 416 may include three types of records for every connected luminaire in the system. In an embodiment, the records include a Sensor Baseline Information record 1202, a Sensor Reading Schedule record 1212, and a Sensor Reading Result record 1228. In an embodiment, each luminaire includes a single Sensor Baseline Information record 1202 and a single Sensor Reading Schedule record 1212 record. The Sensor Reading Result record 1228 is illustrated in FIG. 18 by number ranges between 1 and n. This type of record may be added for each reading result, and may be kept/stored for as long as is needed; thus, n can be very large.

In an embodiment, the Sensor Baseline Information record 1202 includes sensor range information for all possible dimming levels that might be tested for the luminaire. The sensor range information may include a dimming action 1206, a minimal wait time 1208, and a list of sensor ranges 1210. Each dimming action field 1206 may include the minimal Wait time 1208, which directs the gateway to wait before taking sensor measurements, and a list of Sensor range fields 1210. According to an aspect, each sensor that needs to be monitored includes one list of Sensor range fields 1210. The sensors baseline information 1202 includes a Luminaire ID 1204 field, which identifies the luminaire that the record belongs to.

According to an aspect, the Sensor Reading Schedule record 1212 is identical to the Future Reading Schedule 528, as described with reference to FIG. 17. The Sensor Reading Schedule record 1212 may include one additional field, namely, the Luminaire ID 1204 field, which may be used to identify the luminaire 112 that the record belongs to. In an embodiment, the Sensor Reading Result record 1228 is an accumulation of the Sensor Reading Messages 1030 (see, for example, FIG. 16) and includes the Luminaire ID 1204 field. According to an aspect, each time the cloud servers 106 (FIGS. 3, 4) receive a Sensor Reading Message 1030 that may be a Baseline message 412 or an Updates message 418, the cloud servers 106 will store the message 412, 418 as a Sensor Reading Result record 1228 for the specific luminaire 112.

Figure 19:
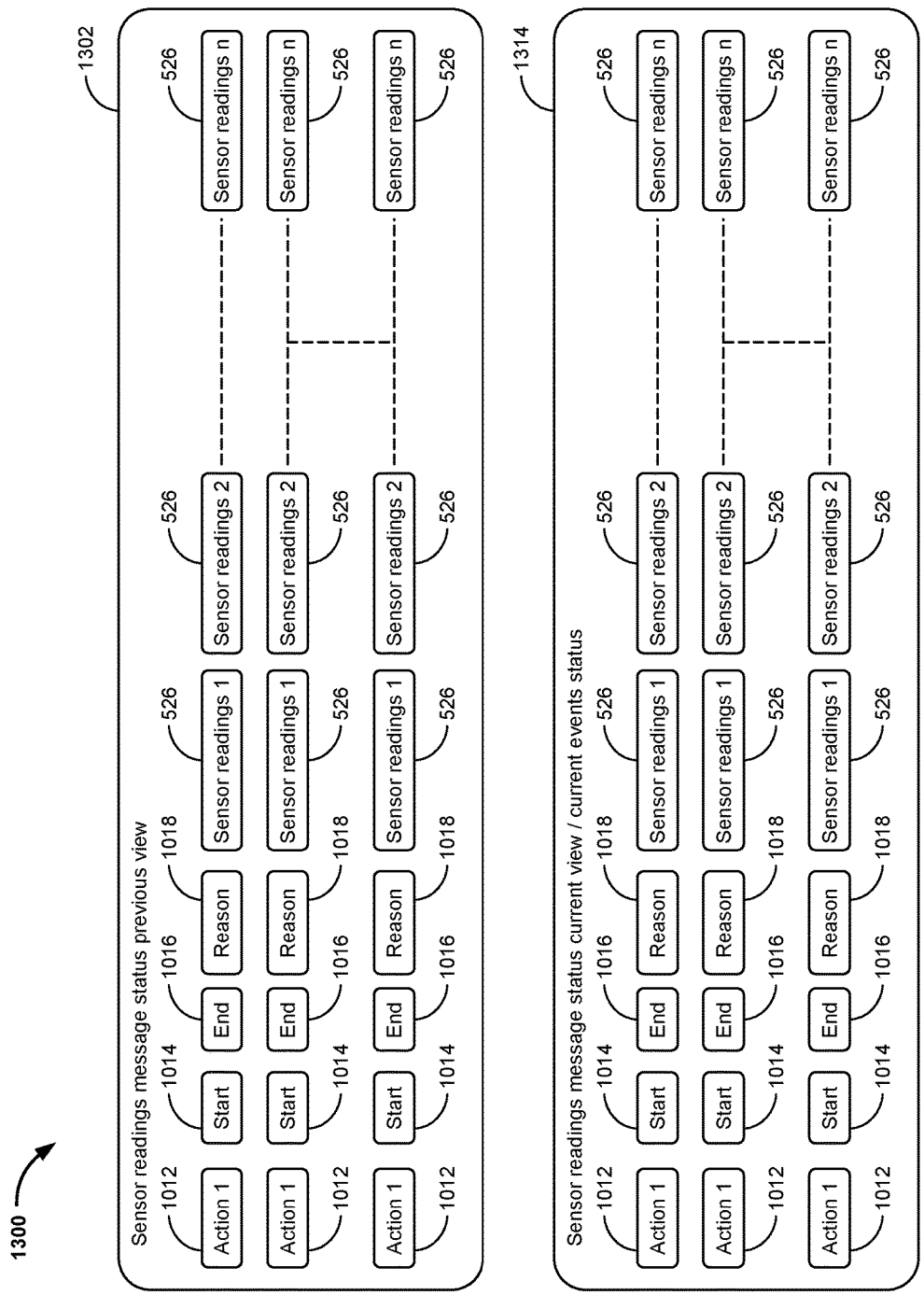
FIG. 19 is a diagram of an events database and message status database structures, according to an aspect.

FIG. 19 illustrates an embodiment 1300 of the Events Database and the Message Status Database structures. In an embodiment and as described hereinabove with reference to FIG. 12, the Sensor Events DB 612 may be the same as the Message Status DB 618. According to an aspect, the Message Status DB 618 is an accumulation of all sensor events associated with the reporting of scheduled test results. The Sensor Events DB 612 may additionally be used to record events in real time, such that the information is recorded into the appropriate structures for future messages to be generated. In an embodiment, the Message Status DB 618 contains two records. The first record is a Sensor Readings Message Status Previous View 1302, and the second record is the Sensor Readings Message Status Current View/Current Events Status 1314. When reading events are triggered, the appropriate fields in the Readings Message Status Current View/Current Events Status 1314 record are updated. The updates may occur in real time, that is, at the same time the reading events are triggered. When an Updates message is being sent, or before a Baseline message is being sent, the content of the Sensor Readings Message Status Current View/Current Events Status 1314 is copied into the Sensor Readings Message Status Previous View 1302. When a Baseline message is being sent, the entire Sensor Readings Message Status Previous View 1302 record (see FIG. 16) may be sent.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary embodiments lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing an emergency lighting fixture function test, comprising:
   logging a start time for the test;
   switching off a power supply to a luminaire, wherein switching off the power supply to the luminaire comprises switching off a power supply through a gateway;
   initiating illumination of the luminaire by an emergency power source;
   measuring with a color sensor configured to face the luminaire directly a color intensity of the light that is emitted by the luminaire, either continuously or at intervals;
   measuring with an environment sensor, either continuously or at intervals, an ambient light intensity in an environment in which the luminaire is installed;
   transmitting respective data regarding the color intensity of the light that is emitted by the luminaire and the ambient light intensity, from the color sensor and environment sensor, to a server, either directly or via the gateway;
   determining with the server at least one of a lux level at the luminaire and a floor lux in the environment, based at least in part on the data regarding color intensity of the light that is emitted by the luminaire and the ambient light intensity;
   determining with the server whether at least one of the lux level at the luminaire and the floor lux is above a threshold lux level; and,
   logging whether the test is a PASS or FAIL, based at least in part on whether at least one of the lux level at the luminaire and the floor lux is above a threshold lux level.

2. A method for performing an emergency lighting fixture duration test, comprising:
   a) logging a start time of a test;
   b) switching off a power supply to a luminaire, wherein switching off the power supply to the luminaire comprises switching off a power supply through a gateway;
   c) initiating illumination of the luminaire by an emergency power source;
   d) measuring with a color sensor configured to face the luminaire directly a color intensity of the light that is emitted by the luminaire, either continuously or at intervals;
   e) measuring with an environment sensor, either continuously or at intervals, an ambient light intensity in an environment in which the luminaire is installed;
   f) transmitting respective data regarding the color intensity of the light that is emitted by the luminaire and the ambient light intensity, from the color sensor and environment sensor, to a server, either directly or via the gateway;
   g) determining with the server at least one of a lux level at the luminaire and a floor lux in the environment, based at least in part on the data regarding color intensity of the light that is emitted by the luminaire and the ambient light intensity;
   h) determining with the server whether at least one of the lux level at the luminaire and the floor lux is above a respective threshold lux level; and,
   i) logging whether the test is a PASS or FAIL, based at least in part on whether the at least one of the lux level at the luminaire and the floor lux is above the respective threshold lux level, and, if the test is a PASS, repeating steps d)-h) for at least one of an amount of time or a degree of depletion of the emergency power source, or, if the test is a FAIL, logging an end time for the test and restoring power to the luminaire.

3. The method of claim 2, further comprising calculating with the server a predictive curve for life expectancy of the emergency power source, based at least in part on the data regarding the color intensity of the light that is emitted by the luminaire and the ambient light intensity.

4. The method of claim 2, further comprising calculating with the server at least one of a half-life and end of life of the emergency power source, wherein calculating with the server at least one of a half-life and end of life of the emergency power source comprises comparing the data regarding the color intensity of the light that is emitted by the luminaire during two or more duration tests.

5. The method of claim 2, wherein the emergency power source is a rechargeable battery and the method further comprises:
   logging a battery charging cycle start time after restoring power to the luminaire;
   charging the rechargeable battery with a charging device, wherein the charging device is connected to the power supply to the luminaire;
   measuring with a power meter an amount of power being drawn by the gateway during the charging;
   comparing with the server the amount of power being drawn by the gateway during the charging to an amount of power drawn by the gateway in a non-charging state, and, if the power being drawn by the gateway during an amount of time of the charging is less than the amount of power drawn by the gateway in a non-charging state, determining that the charging is complete;
   logging a battery charging cycle end time and a battery charging cycle duration; and,
   determining with the server a required duration for the test, based at least in part on at least one of the battery charging cycle duration and an amount of time that is required to charge the rechargeable battery to a level at which the rechargeable battery is capable of powering the luminaire at a requisite lux level for a requisite amount of time of emergency operation.

6. The method of claim 5, further comprising determining with the server a life expectancy of the rechargeable battery, based at least in part on the battery charging cycle duration.

7. The method of claim 6, wherein determining a life expectancy of the rechargeable battery is based at least in part on at least one of a comparison of the battery charging cycle duration to known performance values for the rechargeable battery and a comparison of the battery charging cycle duration in two or more duration tests.

8. The method of claim 2, further comprising determining with the server at least one of a dimming level of the luminaire and a dimming control protocol of the luminaire at which the emergency power source is capable of powering the luminaire at a requisite lux level for a requisite amount of time of emergency operation.

\* \* \* \* \*